(12) United States Patent
Lee et al.

(10) Patent No.: US 11,422,293 B2
(45) Date of Patent: Aug. 23, 2022

(54) OUTWARD COUPLING SUPPRESSION IN WAVEGUIDE DISPLAY

(71) Applicant: Facebook Technologies, LLC, Menlo Park, CA (US)

(72) Inventors: Hee Yoon Lee, Bellevue, WA (US); Ningfeng Huang, Redmond, WA (US); Pasi Saarikko, Kirkland, WA (US); Yu Shi, Redmond, WA (US); Giuseppe Calafiore, Redmond, WA (US); Nihar Ranjan Mohanty, Snoqualmie, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 17/378,546

(22) Filed: Jul. 16, 2021

(65) Prior Publication Data
US 2021/0341654 A1 Nov. 4, 2021

Related U.S. Application Data

(63) Continuation of application No. 16/549,567, filed on Aug. 23, 2019, now Pat. No. 11,099,309.

(51) Int. Cl.
*G02B 6/124* (2006.01)
*G02B 5/18* (2006.01)
(Continued)

(52) U.S. Cl.
CPC ......... *G02B 5/1828* (2013.01); *G02B 5/1814* (2013.01); *G02B 5/1852* (2013.01);
(Continued)

(58) Field of Classification Search
CPC .. G02B 5/1828; G02B 5/1814; G02B 5/1852; G02B 6/0033; G02B 6/0075;
(Continued)

(56) References Cited

U.S. PATENT DOCUMENTS 6,522,812 B1 2/2003 Nikonov
10,234,696 B2 * 3/2019 Popovich ............. G02B 6/0023
(Continued)

OTHER PUBLICATIONS

PCT/US2020/044665 Search Report dated Oct. 29, 2020.
(Continued)

*Primary Examiner* — Ellen E Kim
(74) *Attorney, Agent, or Firm* — Pequignot + Myers; Matthew A. Pequignot

(57) ABSTRACT

A pupil replication waveguide for a projector display includes a slab of transparent material for propagating display light in the slab via total internal reflection. A diffraction grating is supported by the slab. The diffraction grating includes a plurality of tapered slanted fringes in a substrate for out-coupling the display light from the slab by diffraction into a blazed diffraction order. A greater portion of the display light is out-coupled into the blazed diffraction order, and a smaller portion of the display light is out-coupled into a non-blazed diffraction order. The tapered fringes result in the duty cycle of the diffraction grating varying along the thickness direction of the diffraction grating, to facilitate suppressing the portion of the display light out-coupled into the non-blazed diffraction order.

19 Claims, 17 Drawing Sheets

(51) Int. Cl.
*G02F 1/295* (2006.01)
*F21V 8/00* (2006.01)
*G02B 6/136* (2006.01)

(52) U.S. Cl.
CPC ......... *G02B 6/0033* (2013.01); *G02B 6/0075* (2013.01); *G02B 6/136* (2013.01); *G02F 1/2955* (2013.01)

(58) Field of Classification Search
CPC ............... G02B 6/136; G02B 27/0103; G02B 27/0172; G02B 27/0081; G02F 1/2955
See application file for complete search history.

(56) References Cited

U.S. PATENT DOCUMENTS

| | | |
|---|---|---|
| 10,241,269 B1 | 3/2019 | Jacob et al. |
| 2012/0120493 A1 | 5/2012 | Simmonds et al. |
| 2014/0140653 A1 | 5/2014 | Brown et al. |
| 2014/0140654 A1 | 5/2014 | Brown et al. |
| 2015/0063753 A1 | 3/2015 | Evans et al. |
| 2016/0274281 A1 | 9/2016 | Lutolf et al. |
| 2017/0131551 A1* | 5/2017 | Robbins .............. G02F 1/13439 |
| 2018/0210207 A1* | 7/2018 | Machida ............ G02B 27/0176 |
| 2019/0086674 A1* | 3/2019 | Sinay ................. G02B 27/0172 |
| 2019/0212589 A1 | 7/2019 | Waldern et al. |
| 2019/0212699 A1 | 7/2019 | Waldern et al. |
| 2019/0227375 A1* | 7/2019 | Oh ........................ G02F 1/1337 |
| 2020/0012093 A1 | 1/2020 | Marshall |
| 2020/0158943 A1 | 5/2020 | Calafiore |

OTHER PUBLICATIONS

PCT/US2020/044671 Search Report dated Nov. 3, 2020.
PCT/US2020/044665 Written Opinion dated Oct. 29, 2020.
PCT/US2020/044671 Written Opinion dated Nov. 3, 2020.
International Preliminary Report on Patentability for International Application No. PCT/US2020/044665, dated Mar. 3, 2022, 8 pages.
International Preliminary Report on Patentability for International Application No. PCT/US2020/044671, dated Mar. 3, 2022, 8 pages.

* cited by examiner

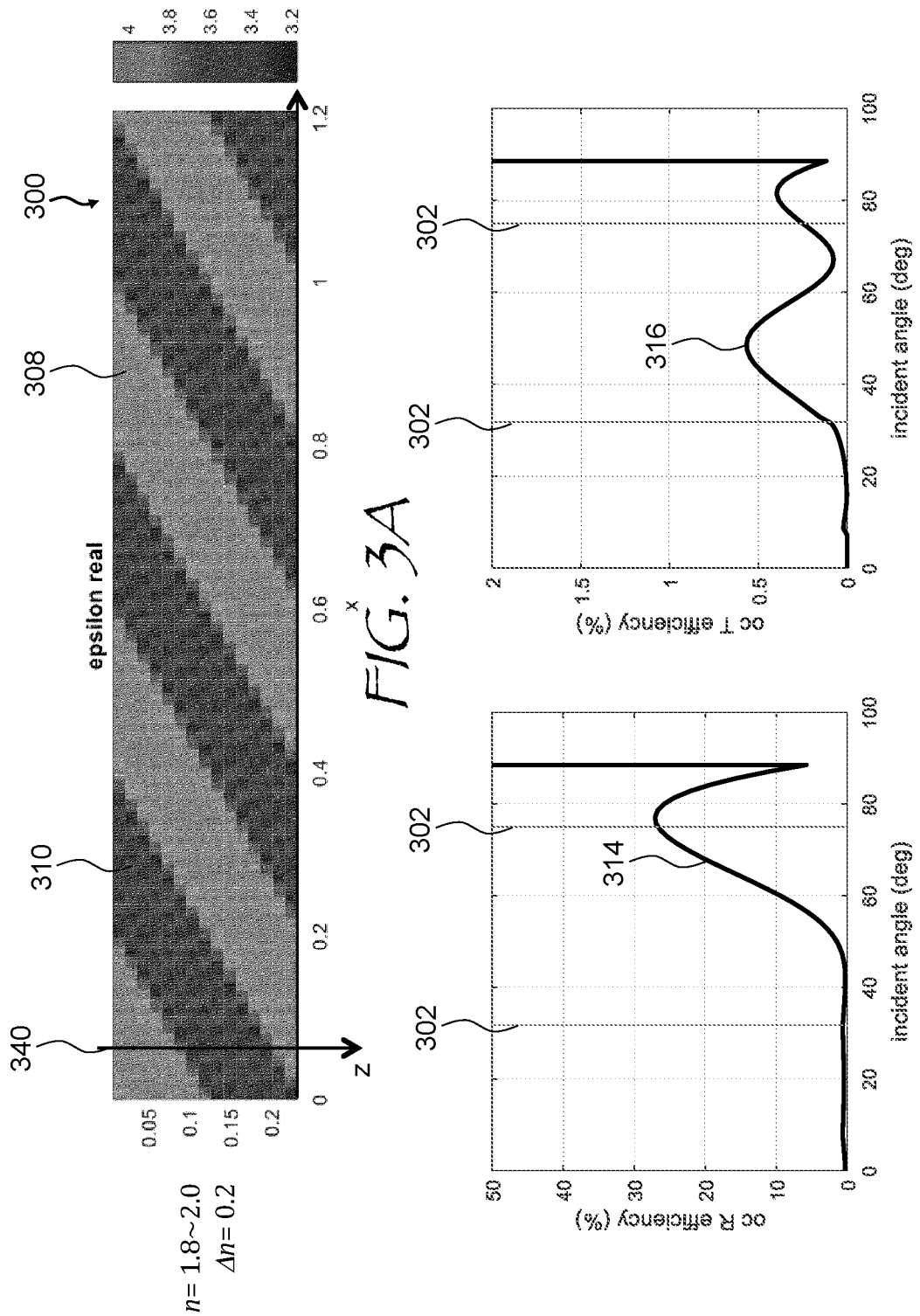

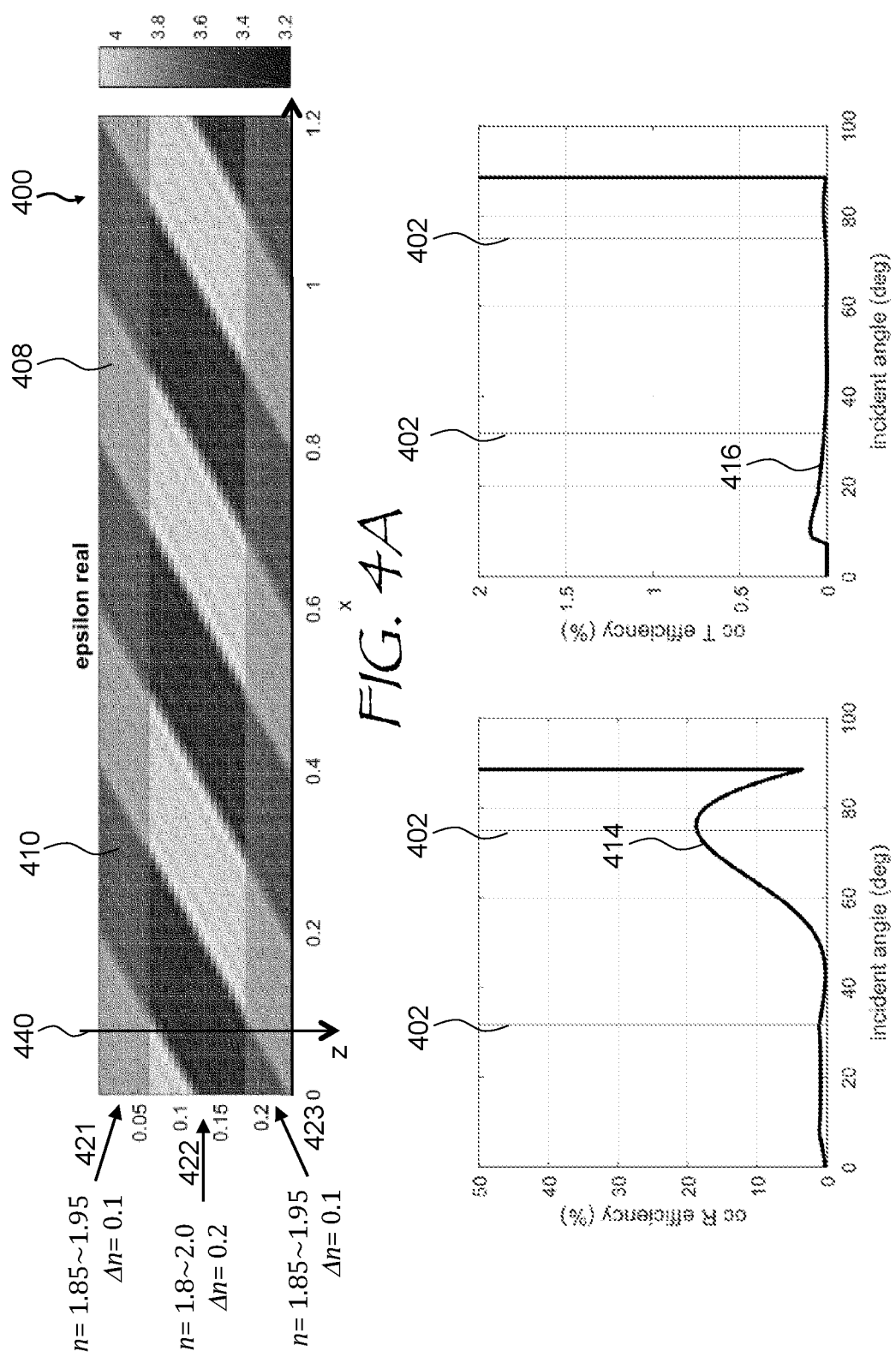

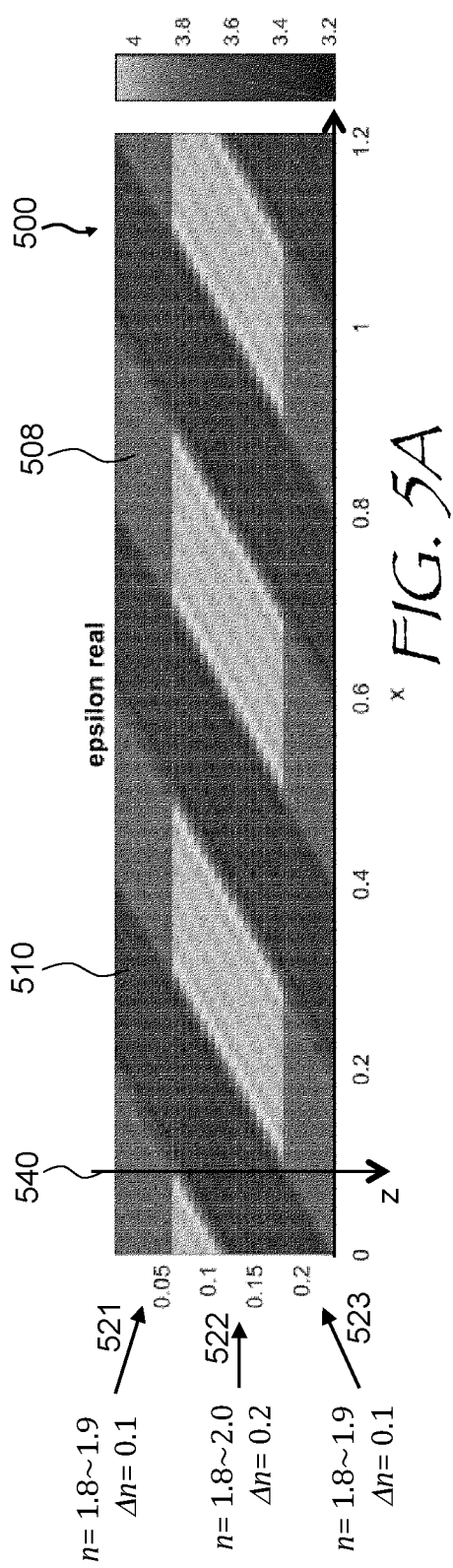
FIG. 5A
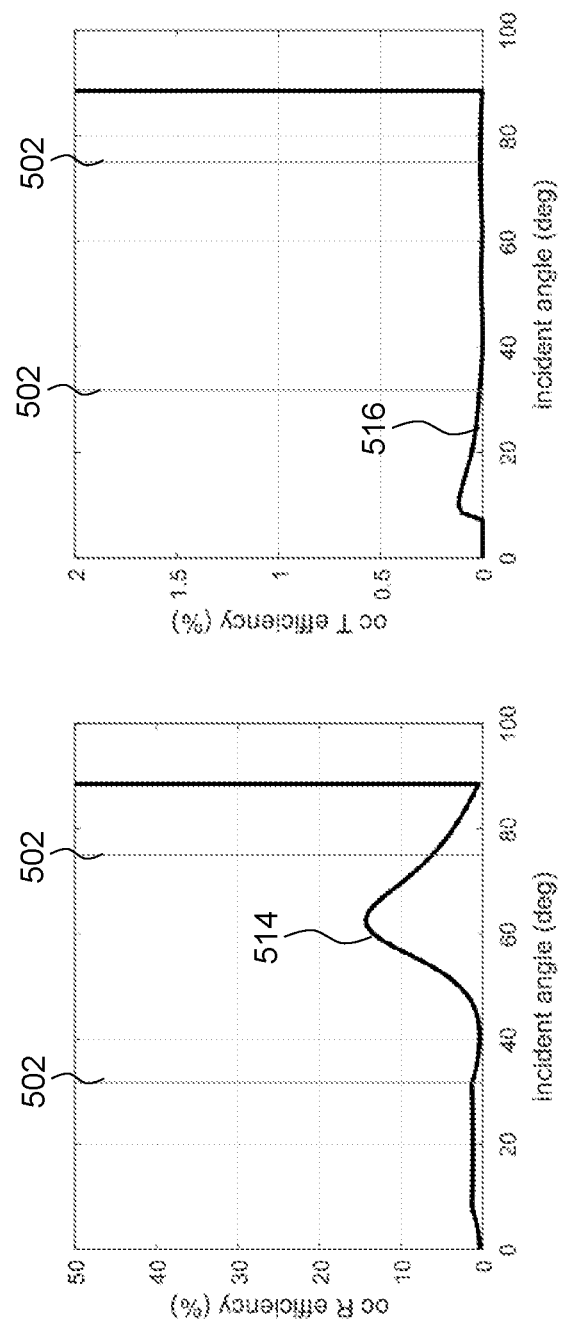
FIG. 5B
FIG. 5C

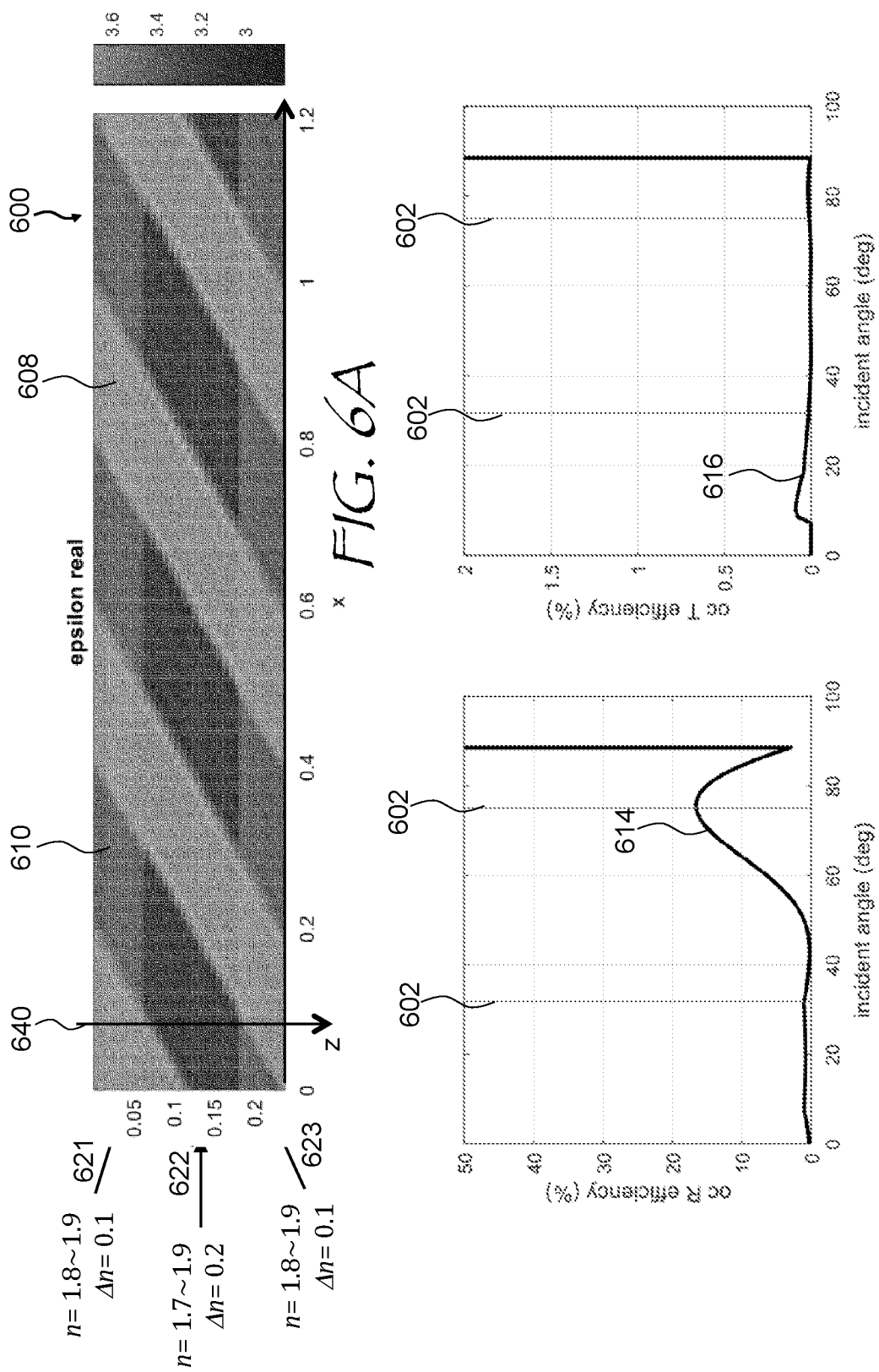

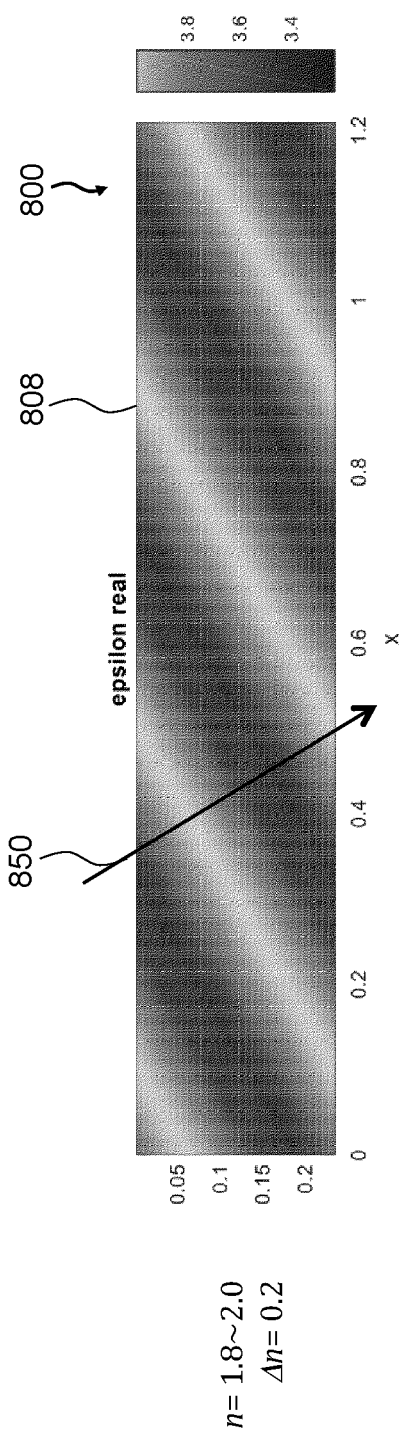
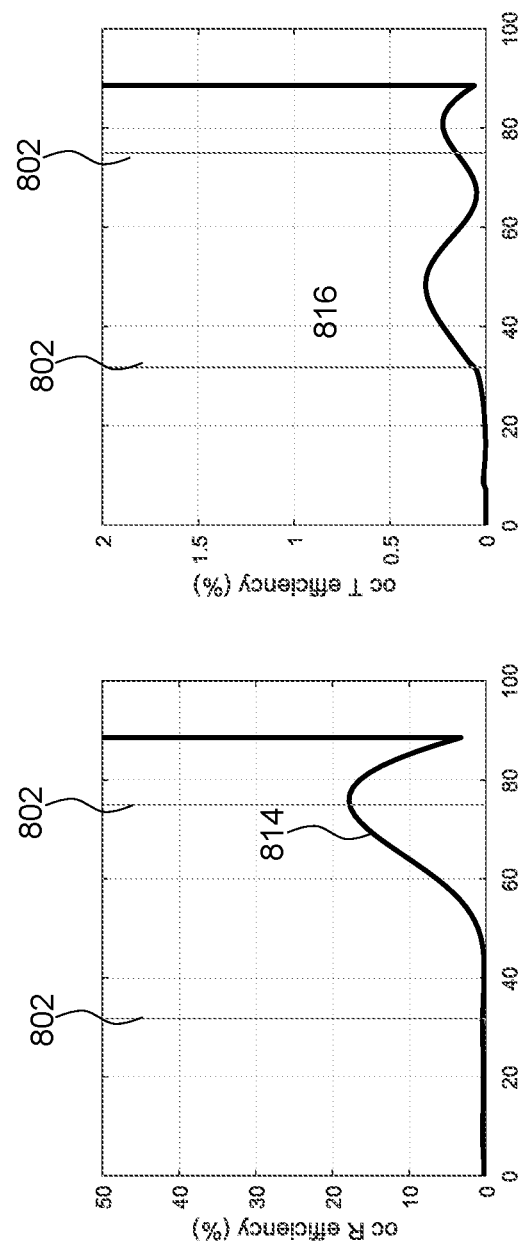
FIG. 8A
FIG. 8B
FIG. 8C

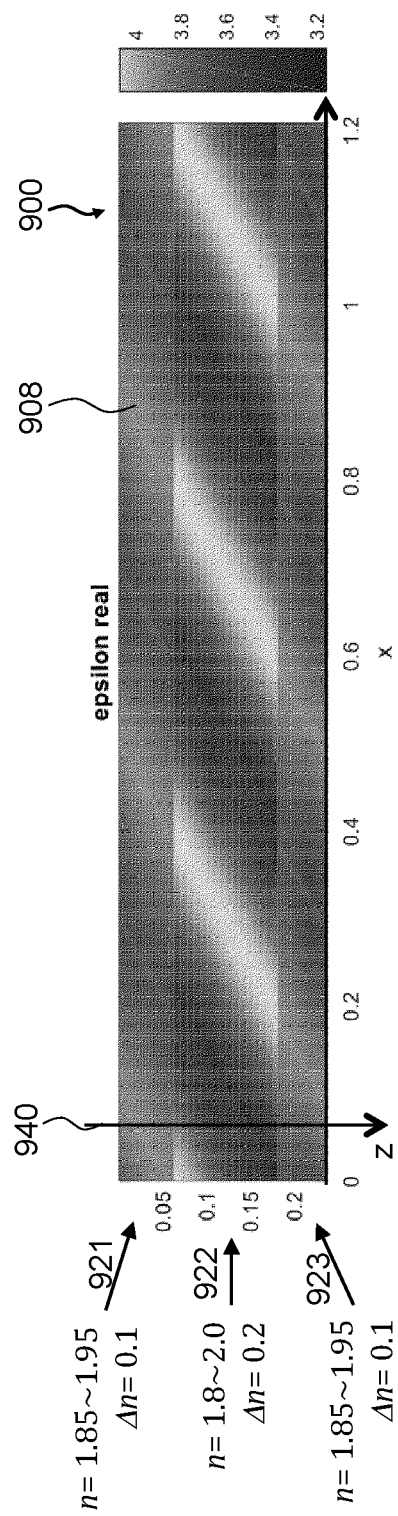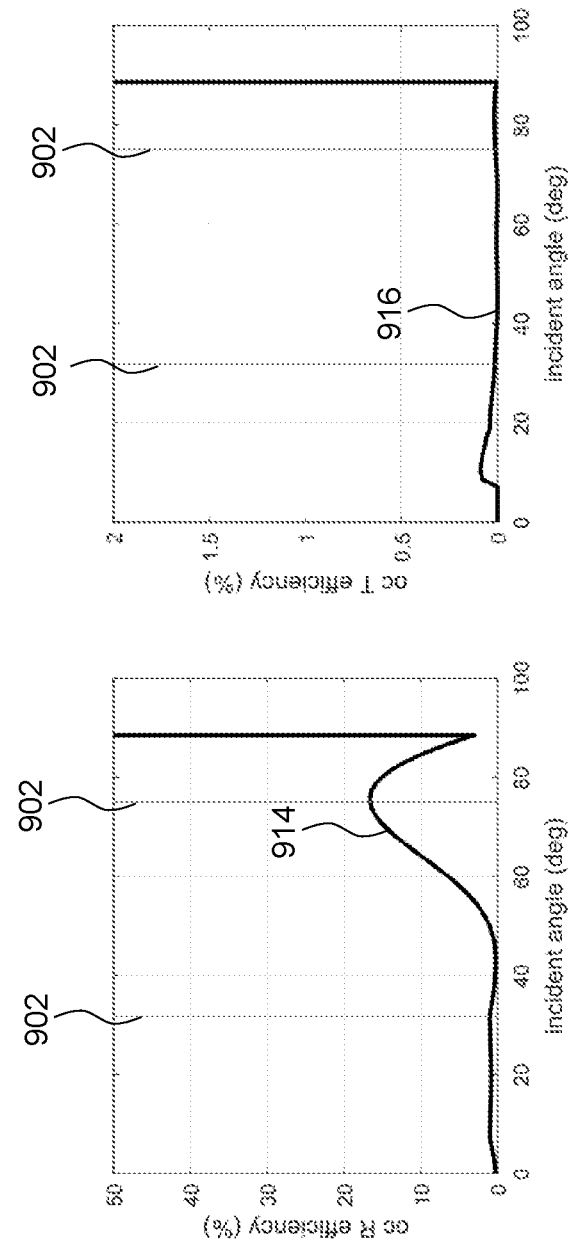
FIG. 9A
FIG. 9B
FIG. 9C

OUTWARD COUPLING SUPPRESSION IN WAVEGUIDE DISPLAY

REFERENCE TO RELATED APPLICATION

The present invention is a continuation of U.S. patent application Ser. No. 16/549,567 filed on Aug. 23, 2019 and incorporated herein by reference in its entirety.

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. A pupil replication waveguide is used to carry the image in angular domain to the user's eye. The lack of a screen or a display panel in a scanning projector display enables size and weight reduction of the display.

Ideally, pupil replication waveguides provide a sufficient directivity to make sure that the images being displayed may only be seen by the wearer of the display and not by outside observers. In many current pupil replication waveguides however, a small but noticeable portion of display light leaks out of the display, enabling outside observers to see some of the displayed imagery and impeding an eye contact with the wearer of the display.

SUMMARY

In accordance with the present disclosure, there is provided a pupil replication waveguide comprising a slab of transparent material for propagating display light therein via total internal reflection. A diffraction grating is supported by the slab. The diffraction grating includes a plurality of fringes formed by a twisted nematic (TN) liquid crystal (LC) material in a polymer substrate. The fringes are slanted for out-coupling the display light from the slab by diffraction into a blazed diffraction order. A greater portion of the display light is out-coupled into the blazed diffraction order, and a smaller portion of the display light is out-coupled into a non-blazed diffraction order. The TN LC material has an ordinary refractive index $n_O$ for light polarized perpendicular to molecules of the TN LC material, and an extraordinary refractive index $n_E$ for light polarized parallel to the molecules of the TN LC material. A refractive index contrast for polarized display light impinging onto the diffraction grating has a refractive index contrast profile along a thickness direction of the diffraction grating. A refractive index contrast is larger at a middle than at both sides of the refractive index contrast profile, whereby a portion of the impinging polarized display light out-coupled into the non-blazed diffraction order is lessened.

In some embodiments, a refractive index material of the polymer substrate is closer to $n_O$ than to $n_E$, whereby the refractive index contrast is larger at a middle than at both sides of the refractive index contrast profile. The refractive index contrast profile may be symmetrical along the thickness direction of the diffraction grating, and may be substantially zero at both sides. The refractive index contrast profile may be a smoothly varying function, e.g. a Gaussian function. The TN LC material may be polymer-stabilized. In some embodiments, the pupil replication waveguide further includes an input grating for in-coupling the display light into the slab.

In accordance with the present disclosure, there is provided a method of manufacturing a pupil replication waveguide. The method includes forming on a slab of transparent material a plurality of slanted fringes for out-coupling display light from the slab by diffraction into a blazed diffraction order, the slanted fringes having a first refractive index $n_1$. A conforming layer may be formed on the plurality of slanted fringes and the slab. The conforming layer forms gaps between the slanted fringes covered with the conforming layer. The conforming layer has a second refractive index $n_2$. An overcoat layer is formed on the conforming layer, the overcoat layer filling the gaps between the slanted fringes covered with the conforming layer and having a third refractive index $n_3$, where $n_1 > n_2 > n_3$ or $n_1 < n_2 < n_3$.

In accordance with the present disclosure, there is further provided a pupil replication waveguide comprising a slab of transparent material for propagating display light therein via total internal reflection. A diffraction grating is supported by the slab. The diffraction grating includes a plurality of slanted fringes for out-coupling display light from the slab by diffraction into a blazed diffraction order, the slanted fringes having a first refractive index $n_1$. A conforming layer is provided on the plurality of slanted fringes and the slab, the conforming layer forming gaps between the slanted fringes covered with the conforming layer. The conforming layer has a second refractive index $n_2$. An overcoat layer is formed on the conforming layer, the overcoat layer being disposed in the gaps between the slanted fringes covered with the conforming layer and having a third refractive index $n_3$, where $n_1 > n_2 > n_3$ or $n_1 < n_2 < n_3$. An effective refractive index profile of the diffraction grating along a thickness direction of the diffraction grating may be symmetrical, and a refractive index contrast may be larger at a middle than at both sides of the refractive index contrast profile.

In some embodiments of the method and apparatus, the plurality of slanted fringes is formed by imprinting or etching. The conforming layer may be formed by atomic layer deposition (ALD). The overcoat layer may be formed by spin-coating.

BRIEF DESCRIPTION OF THE DRAWINGS

Exemplary embodiments will now be described in conjunction with the drawings, in which:

FIG. 3A is a permittivity map of a diffraction grating of a pupil replication waveguide;

FIG. 3B is a plot of a diffraction efficiency into a blazed diffraction order vs. angle of incidence of display light at the diffraction grating of FIG. 3A;

FIG. 3C is a plot of a diffraction efficiency into a non-blazed diffraction order vs. angle of incidence of the display light at the diffraction grating of FIG. 3A;

FIG. 4A is a permittivity map of a diffraction grating of a pupil replication waveguide, the diffraction grating including a stack of three layers with different refractive index contrast;

FIG. 4B is a plot of a diffraction efficiency into a blazed diffraction order vs. angle of incidence of display light at the diffraction grating of FIG. 4A;

FIG. 4C is a plot of a diffraction efficiency into a non-blazed diffraction order vs. angle of incidence of the display light at the diffraction grating of FIG. 4A;

FIG. 5A is a permittivity map of a diffraction grating of a pupil replication waveguide, the diffraction grating including a stack of three layers with different refractive index contrast and variable-index slanted fringes extending across all three layers;

FIG. 5B is a plot of a diffraction efficiency into a blazed diffraction order vs. angle of incidence of display light at the diffraction grating of FIG. 5A;

FIG. 5C is a plot of a diffraction efficiency into a non-blazed diffraction order vs. angle of incidence of the display light at the diffraction grating of FIG. 5A;

FIG. 6A is a permittivity map of a diffraction grating of a pupil replication waveguide, the diffraction grating including a stack of three layers with different refractive index contrast and high-index slanted fringes extending across all three layers;

FIG. 6B is a plot of a diffraction efficiency into a blazed diffraction order vs. angle of incidence of display light at the diffraction grating of FIG. 6A;

FIG. 6C is a plot of a diffraction efficiency into a non-blazed diffraction order vs. angle of incidence of the display light at the diffraction grating of FIG. 6A;

FIG. 8A is a refractive index map of a Bragg grating of a pupil replication waveguide;

FIG. 8B is a plot of a diffraction efficiency into a blazed diffraction order vs. angle of incidence of display light at the Bragg grating of FIG. 8A;

FIG. 8C is a plot of a diffraction efficiency into a non-blazed diffraction order vs. angle of incidence of the display light at the Bragg grating of FIG. 8A;

FIG. 9A is a permittivity map of a Bragg grating of a pupil replication waveguide, the Bragg grating having areas of different refractive index contrast;

FIG. 9B is a plot of a diffraction efficiency into a blazed diffraction order vs. angle of incidence of display light at the diffraction grating of FIG. 9A;

FIG. 9C is a plot of a diffraction efficiency into a non-blazed diffraction order vs. angle of incidence of the display light at the diffraction grating of FIG. 9A;

DETAILED DESCRIPTION

Figure 1:
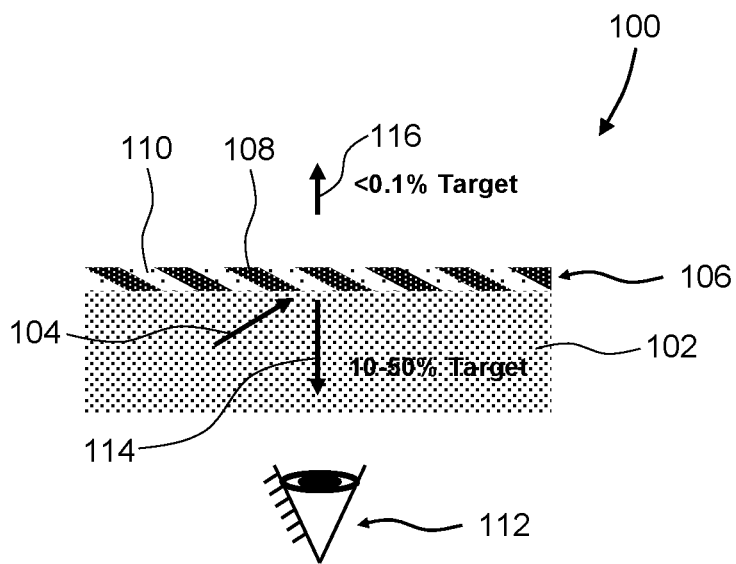
FIG. 1 is a side cross-sectional view of a pupil replication waveguide.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Light leaking outside of a near-eye display based on a projector and a pupil replication waveguide may be caused by diffraction of display light at a diffraction grating of the pupil replication waveguide in an undesired direction, i.e. outside of the display towards outside world, and not inside of the display towards the user's eyes. For blazed diffraction gratings, i.e. gratings with grooves or fringes slanted to diffract the impinging light more efficiently into one diffraction order, e.g. first diffraction order, than into an opposite diffraction order, e.g. minus first diffraction order, some light may still leak in the direction of the non-blazed diffraction order, that is, outside of the display. The leaked display light may be distracting to people interacting with the wearer of the near-eye display, and may enable the other viewers to see the displayed content (text, images, etc.), potentially causing privacy issues.

In accordance with the present disclosure, a diffraction grating of a pupil replication waveguide may be configured to reduce diffraction in unwanted direction(s), i.e. into non-blazed orders of diffraction. To that end, a refractive index contrast profile of a diffraction grating in a direction of thickness of the diffraction grating, that is, across the thickness of the diffraction grating, may be reduced at extremities of the diffraction grating, that is, at top and bottom surfaces of the diffraction grating, as compared to the refractive index contrast at the middle thickness of the diffraction grating. Such apodization of the refractive index contrast can suppress the diffraction of light into the unwanted or non-blazed orders of diffraction. Herein, the refractive index contrast is defined as a difference of refractive index of the diffraction grating fringes and the refractive index of the underlying substrate in which the fringes are suspended.

The refractive index contrast apodization may be achieved by a variety of means. In some embodiments, the diffraction grating may be layered, each layer having its own refractive index contrast. In some embodiments, a more smooth variation may be produced by processing, i.e. controlled baking, of the diffraction grating layer materials. In some embodiments, a duty cycle, or a fill factor, of a diffraction grating may be varied in going through the thickness of the diffraction grating by tapering or otherwise shaping diffraction grating grooves or fringes. These and other embodiments will be considered in more detail further below.

Referring to FIG. 1, a pupil replication waveguide 100 includes a slab 102 of a transparent material for propagating display light 104 in the slab 102 by sequential total internal reflections (TIR) from top and bottom parallel surfaces of the slab 102. Herein, the term "transparent" includes both completely transparent, as well as partially transparent or translucent, i.e. somewhat absorbing or scattering, but transparent enough for a sufficient amount of display light to be conveyed to the user's eye for the user to see the displayed image. The slab 102 is generally plano-parallel, although slight curvature of the slab may be acceptable in some cases.

A diffraction grating 106 is supported by the slab 102. The diffraction grating 106 includes a plurality of fringes 108 in a substrate 110. A refractive index of the fringes 108 is different from a refractive index of the substrate 110. The refractive index of the fringes 108 may be larger or smaller than the refractive index of the substrate 110. A refractive index contrast is defined herein as a modulus of difference between the refractive indices of the fringes 108 and the substrate 110. The fringes 108 are slanted as shown in FIG. 1 for out-coupling a greater portion 114 of the display light 104 from the slab 102 for observation of the display light 104 by a user's eye 112. Typically, the greater portion 114 is about 10% to 50% of the display light 104 in optical power levels. A smaller portion 116 of the display light 104 is out-coupled in a "wrong" direction, i.e. outside of the near-eye display, and may be observed by others. As explained above, it is desirable to reduce the smaller portion 116. In some embodiments, the smaller portion 116 may be reduced to at least 0.1% of the optical power level of the display light 104. An input coupler, such as an input diffraction grating, may be provided in the pupil replication waveguide 100 for in-coupling the display light 104 into the slab 102.

Figure 2:
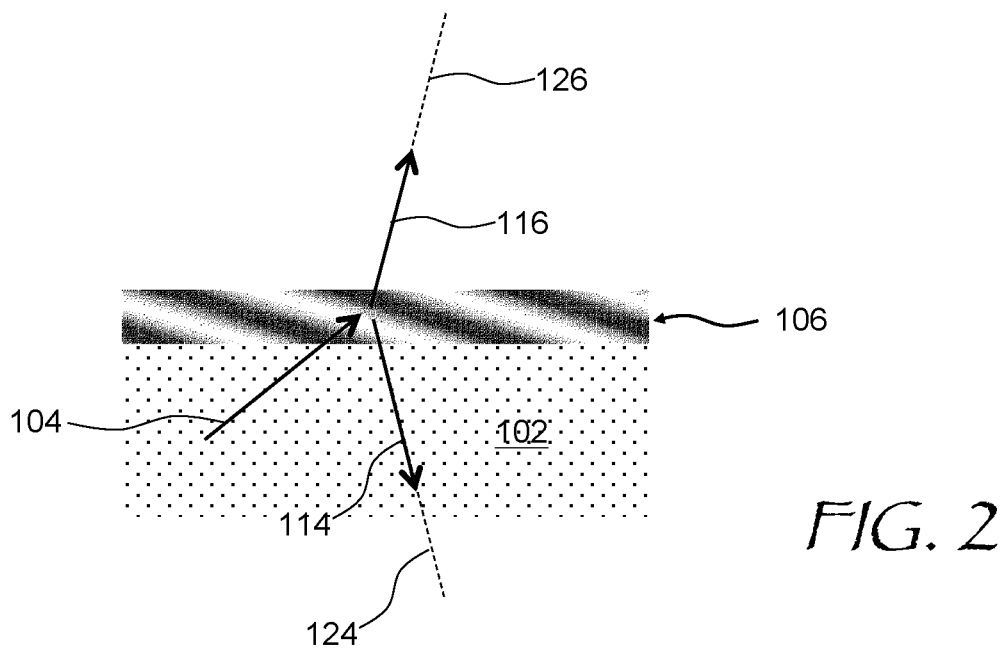
FIG. 2 is a magnified cross-sectional view of the pupil replication waveguide of FIG. 1 showing display light diffraction into blazed and non-blazed diffraction orders.

Referring to FIG. 2, diffraction of the display light 104 on the diffraction grating 106 is shown in more detail. The fringes 108 of the diffraction grating 106 are tilted, or slanted, towards the impinging display light 104 to diffract the greater portion 114 of the display light 104 into a blazed diffraction order 124. The smaller portion 116 of the display light 104 is diffracted into a non-blazed diffraction order 126.

Referring to FIG. 3A, a relative permittivity $\varepsilon$ of a diffraction grating 300 for a pupil replication waveguide, e.g. the pupil replication waveguide 100 of FIG. 1, is plotted against x- and z-coordinates in micrometers. The x-coordinate is a lateral coordinate along a surface of the diffraction grating 300, and the z-coordinate is a thickness coordinate, i.e. a coordinate in a direction of thickness 340 of the diffraction grating 300, of a particular location within diffraction grating 300. The diffraction grating 300 includes a plurality of slanted fringes 308 of high permittivity, which is equal to 4.0 in this example, suspended in a substrate material 310 of low permittivity of 3.24. Herein, the terms "high" and "low" are relative to one another, i.e. the fringe permittivity is higher than the substrate permittivity. In some embodiments, the fringe 308 permittivity is lower than the substrate 310 permittivity. For non-magnetic, non-absorbing media, the relative permittivity $\varepsilon_r$ and the refractive index n are related as $\varepsilon_r = n^2$. Accordingly, the slanted fringes 308 have the index of refraction $n_F = 2$, and the substrate material 310 has the index of refraction $n_S = 1.8$. The refractive index contrast $\Delta n = |n_F - n_S|$ is equal to 0.2 in this case. The slanted fringes 308 may be formed lithographically on a transparent slab, not shown, and the substrate material 308 may be coated onto the slanted fringes 308 by spin-coating, for example.

FIG. 3B shows a result of computation of the blazed diffraction order diffraction efficiency 314 vs. angle of incidence for the diffraction grating 300 of FIG. 3A. Vertical lines 302 denote an angular range within which the display light is guided by the waveguide slab (not shown) supporting the diffraction grating 300. In this example, the blazed diffraction order diffraction efficiency 314 reaches about 28%. In comparison, a computed non-blazed diffraction order diffraction efficiency 316, shown in FIG. 3C, reaches only about 0.6% (the vertical scales in FIGS. 3B and 3C are different). Even though this does not seem much as compared to the blazed diffraction order diffraction efficiency 314, the 0.6% of incoming display light may become quite noticeable to outside observers of a near-eye display with this waveguide, and may appear distracting or annoying to the outside observers, and may impede or even completely prevent the eye contact with the display wearer.

Referring now to FIG. 4A, a relative permittivity of a diffraction grating 400 for a pupil replication waveguide, e.g. the pupil replication waveguide 100 of FIG. 1, is plotted against x- and z-coordinates in micrometers. The x-coordinate is a lateral coordinate, and the z-coordinate is a thickness coordinate of a particular location within the diffraction grating 400. As shown in FIG. 4A, the diffraction grating 400 includes a stack of first 421, second 422, and third 423 grating layers. The second grating layer 422 is disposed in the middle, i.e. between the first 421 and third 423 grating layers. The first 421 and third 423 grating layers have substantially a same thickness. Herein and throughout the rest of the specification, the term "substantially" when applied to a parameter means within 10% of a median value of the parameter, for certainty.

The second grating layer 422 is thicker than any of the first 421 and third 423 grating layers, specifically about 2 times thicker in this example. In other words, the thickness of the second grating layer 422 is substantially equal to a sum thickness of the first 421 and third 423 grating layers. For example, in some embodiments, the thickness of the first 421 and third 423 grating layer may be between 75 nm and 85 nm, and the thickness of the second grating layer 422 may be between 150 nm and 170 nm.

A plurality of slanted fringes 408 extend through the first 421, second 422, and third 423 grating layers. The relative permittivity of the slanted fringes 408 may vary from layer to layer. The slanted fringes 408 are suspended in a substrate material 410 having a relative permittivity that also varies from layer to layer, and is lower than the relative permittivity of the fringes 408. The refractive index of the substrate material 410 is lower than the refractive index of the fringes 408, for each layer 421, 422, and 423 of the diffraction grating 400.

The fringes 408 of the diffraction grating 400 have the refractive index $n_F$ of 1.95 in the first 421 and third 423 grating layers, and the refractive index $n_F$ of 2.0 in the second grating layer 422. The substrate material 410 has the refractive index $n_S$ of 1.85 in the first 421 and third 423 grating layers, and the refractive index $n_S$ of 1.8 in the second grating layer 422. Consequently, the refractive index contrast $\Delta n=|n_F-n_S|$ of each one of the first 421, second 422, and third 423 grating layers, while being constant across each grating layer 421, 422, 423, varies from layer to layer: the index contrast $\Delta n$ is equal to 0.1 for the first 421 and third 423 grating layers, and is equal to 0.2 for the second grating layer 422, i.e. the refractive index contrast of the second grating layer 422 is higher than the refractive index contrast of the first 421 and third 423 grating layers. The refractive index contrast profile of the diffraction grating 400 along a thickness direction 440, i.e. z-axis, of the diffraction grating 400 is symmetrical, such that the refractive index contrast $\Delta n$ is larger at a middle than at both sides of the refractive index contrast profile. It is noted that the refractive index values used herein are meant only as examples; the refractive index values and the refractive index contrast values may differ depending on the materials used. It is also to be understood that the statement of a refractive index value for examples considered herein implies a certain tolerance range, e.g. the refractive index of 2.0 means a range from 1.95 to 2.05, the refractive index of 1.8 means a range from 1.75 to 1.85, and so forth.

Referring to FIG. 4B, a computed diffraction efficiency 414 for a blazed diffraction order reaches about 18%, which is slightly above one half of the blazed diffraction order diffraction efficiency 314 (FIG. 3B) of the diffraction grating 300 of FIG. 3A, which is used as a reference. The lower value of maximum diffraction efficiency as compared to that of FIG. 3B may be caused by a lower overall refractive index contrast $\Delta n$, due to the fact that only the middle, second layer 422 has the higher refractive index contrast $\Delta n$ of 0.2, and the remaining first 421 and third 423 layers have the lower refractive index contrast $\Delta n$ of 0.1. Notably, the maximum diffraction efficiency 416 into the non-blazed diffraction order is reduced much more dramatically, to below 0.1%, i.e. by about 6 times, within the angular range of the waveguide 400 outlined with the boundary lines 402 (FIGS. 4B, 4C) denoting an angular range for TIR-guided light. Thus, the apodization of the z-profile of the refractive index contrast $\Delta n$ of the diffraction grating 400 of FIG. 4A lessens the portion of the display light out-coupled into the non-blazed diffraction order 416 (FIG. 4C), to a higher degree than the refractive index contrast of the blazed portion 414. Herein and throughput the specification, the term "apodization" in reference to the refractive index contrast means reduction of the refractive index contrast at the top and bottom surfaces of the diffraction grating 400, so as to smooth out the transition to zero refractive index contrast outside of the diffraction grating 400, i.e. above or below the diffraction grating 400 as viewed in FIG. 4A.

Turning to FIG. 5A, a relative permittivity of a diffraction grating 500 for a pupil replication waveguide, e.g. the pupil replication waveguide 100 of FIG. 1, is plotted against x- and z-coordinates in micrometers. The diffraction grating 500 includes a stack of first 521, second 522, and third 523 grating layers. The second grating layer 522 is disposed in the middle, i.e. between the first 521 and second 523 grating layers. The first 521 and third 523 grating layers have substantially a same thickness, and the second grating layer 522 is thicker, e.g. twice as thick as each one of the first 521 and third 523 grating layers. By way of a non-limiting example, the thickness of the first 521 and third 523 grating layer may be between 75 nm and 85 nm, and the thickness of the second grating layer 522 may be between 150 nm and 170 nm.

A plurality of slanted fringes 508 extend through the first 521, second 522, and third 523 grating layers. The relative permittivity $\varepsilon_F$ and, accordingly, the refractive index $n_F$ of the slanted fringes 508 varies from layer to layer, and is greater in the second grating layer 522. The fringes 508 are suspended in, or supported by, a substrate 510. The refractive index $n_S$ of the substrate 510 is at the same constant value of 1.8 for the first 521, the second 522, and the third 523 grating layers. Since the refractive index $n_F$ of the substrate 510 within the second grating layer 522 is different from the refractive index of the fringes within the first 521 and third 523 grating layers, the refractive index contrast $\Delta n=|n_F-n_S|$ of each one of the first 521, second 522, and third 523 grating layers, while being constant across each grating layer, varies from layer to layer: the index contrast $\Delta n$ is equal to 0.1 for the first 521 and third 523 grating layers, and is equal to 0.2 for the second grating layer 522. The refractive index contrast profile of the diffraction grating 500 along a thickness direction 540, i.e. z-axis, of the diffraction grating is approximately symmetrical, such that the refractive index contrast $\Delta n$ is larger at a middle than at both sides of the refractive index contrast profile. It is noted that, while the diffraction grating 500 of FIG. 5A is structurally different from the diffraction grating 400 of FIG. 4A, the refractive index contrast profile of these two gratings is substantially the same.

FIG. 5B shows a computed diffraction efficiency 514 for display light diffracted by the diffraction grating 500 of FIG. 5A into a blazed diffraction order. The maximum diffraction efficiency is about 15%, which is about one half of the blazed diffraction order diffraction efficiency 314 of the diffraction grating 300 of FIG. 3A used herein as a reference. FIG. 5C illustrates a computed diffraction efficiency 516 for the display light diffracted into a non-blazed diffraction order. The maximum diffraction efficiency 516 for the non-blazed diffraction order is dramatically reduced, to a value below 0.1% within the angular range of the waveguide 500 outlined with boundary lines 502 (FIGS. 5B, 5C) denoting an angular range for guided light. Thus, the apodization of the z-profile of the refractive index contrast $\Delta n$ of the diffraction grating 500 of FIG. 5A also lessens the portion of the display light out-coupled into the non-blazed diffraction order 516 (FIG. 5C), similar to the diffraction grating 400 of FIG. 4A.

Turning to FIG. 6A, a relative permittivity of a diffraction grating 600 for a pupil replication waveguide, e.g. the pupil replication waveguide 100 of FIG. 1, is plotted against x- and z-coordinates in micrometers. The diffraction grating 600 includes a stack of first 621, second 622, and third 623 grating layers. The second grating layer 622 is disposed in the middle, i.e. between the first 621 and second 623 grating layers. The first 621 and third 623 grating layers have substantially a same thickness, and the second grating layer 622 is thicker, e.g. twice as thick as each one of the first 621 and third 623 grating layers. For example, the thickness of the first 621 and third 623 grating layer may be between 75 nm and 85 nm, and the thickness of the second grating layer 622 may be between 150 nm and 170 nm.

A plurality of slanted fringes 608 extend through the first 621, second 622, and third 623 grating layers. The relative permittivity $\varepsilon_F$ and, accordingly, the refractive index $n_F$ of the slanted fringes 608 is the same for each grating layer 621, 622, and 623; for all three layers, the refractive index $n_F$ of the slanted fringes 608 is equal to 1.9 in this example.

The slanted fringes 608 are suspended in a substrate 610. The refractive index $n_S$ of the substrate 610 material varies from layer to layer. In the first grating layer 621 and the third grating layer 623, the refractive index $n_S$ of the substrate 610 is equal to 1.8; and in the second grating layer 622, the refractive index $n_S$ of the substrate 610 is lower, being equal to 1.7. Accordingly, the refractive index contrast $\Delta n=|n_F-n_S|$ of each one of the first 621, second 622, and third 623 grating layers varies from layer to layer: the index contrast $\Delta n$ is equal to 0.1 for the first 621 and third 623 grating layers, and is equal to 0.2 for the second grating layer 622. The refractive index contrast profile of the diffraction grating 600 along a thickness direction 640, i.e. z-axis, of the diffraction grating may be made symmetrical, such that the refractive index contrast $\Delta n$ is larger at a middle than at both sides of the refractive index contrast profile. It is noted that the refractive index contrast profile is the same as in the diffraction grating 400 of FIG. 4A and the diffraction grating 500 of FIG. 5A.

FIG. 6B shows a computed diffraction efficiency 614 for display light diffracted by the diffraction grating 600 of FIG. 6A into a blazed diffraction order. The maximum diffraction efficiency is about 18%, which is over one half of the blazed diffraction order diffraction efficiency 314 of the diffraction grating 300 of FIG. 3A used herein as a reference. Referring to FIG. 6C, a maximum diffraction efficiency for the non-blazed diffraction order 616 is also considerably reduced, to a value below 0.1% within the angular range of the waveguide 600 outlined with boundary lines 602 (FIGS. 6B, 6C). Thus, the apodization of the z-profile of the refractive index contrast $\Delta n$ of the diffraction grating 600 of FIG. 6A lessens the portion of the display light out-coupled into the non-blazed diffraction order 616 (FIG. 6C) to a much greater degree than the portion of display light out-coupled into the blazed diffraction order.

In the examples of the diffraction grating 400 of FIG. 4A, the diffraction grating 500 of FIG. 5A, and the diffraction grating 600 of FIG. 6A, the central (second) grating layer is twice as thick as the outer grating layers (first and third), and the refractive index contrast of the central grating layer is twice higher. Other configurations are possible for the above diffraction gratings. By way of a non-limiting example, the thicknesses of all three grating layers may be made substantially equal to each other, and the refractive index contrast of the central grating layer may be higher, e.g. approximately three times higher than the refractive index contrast of the outer grating layers. Furthermore, the thicknesses of the outer grating layers do not need to be the same, and the number of layers may be grater than three. In some embodiments, the layer structure is symmetrical about the central thickness of the diffraction grating; in other embodiments, it is quasi-symmetrical or even not symmetrical. Generally, the apodization may approximate a smoothly varying bell-shaped function, such as Gaussian function, for example.

Figure 7A:
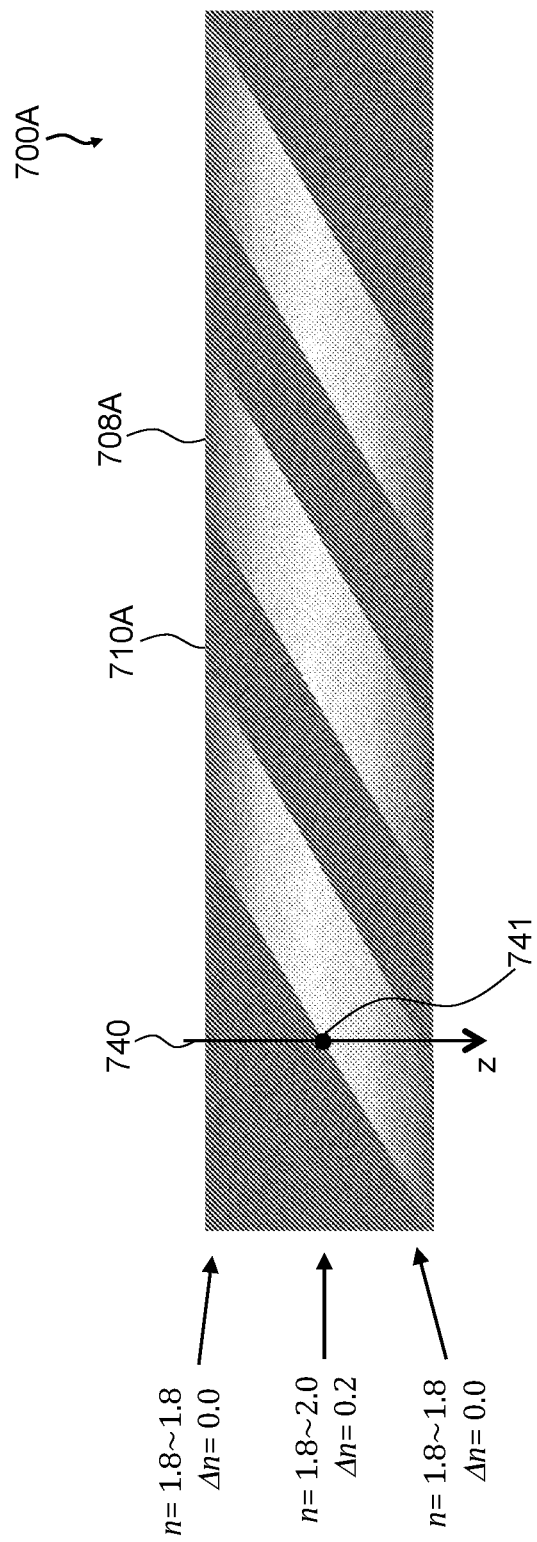
FIG. 7A is a refractive index map of a diffraction grating of a pupil replication waveguide, the diffraction grating including index-graded slanted fringes.

Referring to FIG. 7A, a diffraction grating 700A for a pupil replication waveguide, e.g. the pupil replication waveguide 100 of FIG. 1, includes a plurality of slanted fringes 708A of high refractive index suspended in a substrate material 710A of low refractive index. Herein, the terms "high" and "low" are relative to one another, i.e. the fringe refractive index is higher than the substrate refractive index. The fringes 708A have a refractive index that smoothly varies in a thickness direction 740. The refractive index at a middle point 741 of the thickness is higher than at top and bottom surfaces of the diffraction grating 700A. By way of a non-limiting example, the maximum refractive index of the fringes 708A at the middle point 741 is 2.0, and the refractive index at the top and bottom surfaces is 1.8. The substrate 710A refractive index is uniform at 1.8 in this example. Accordingly, the refractive index profile of the diffraction grating 700A has a bell-like shape with the maximum of 0.2 and minimum of 0. Such a configuration provides a smooth apodization of the refraction index contrast profile, which may considerably reduce the portion of the display light out-coupled into the undesired, non-blazed diffraction order.

Figure 7B:
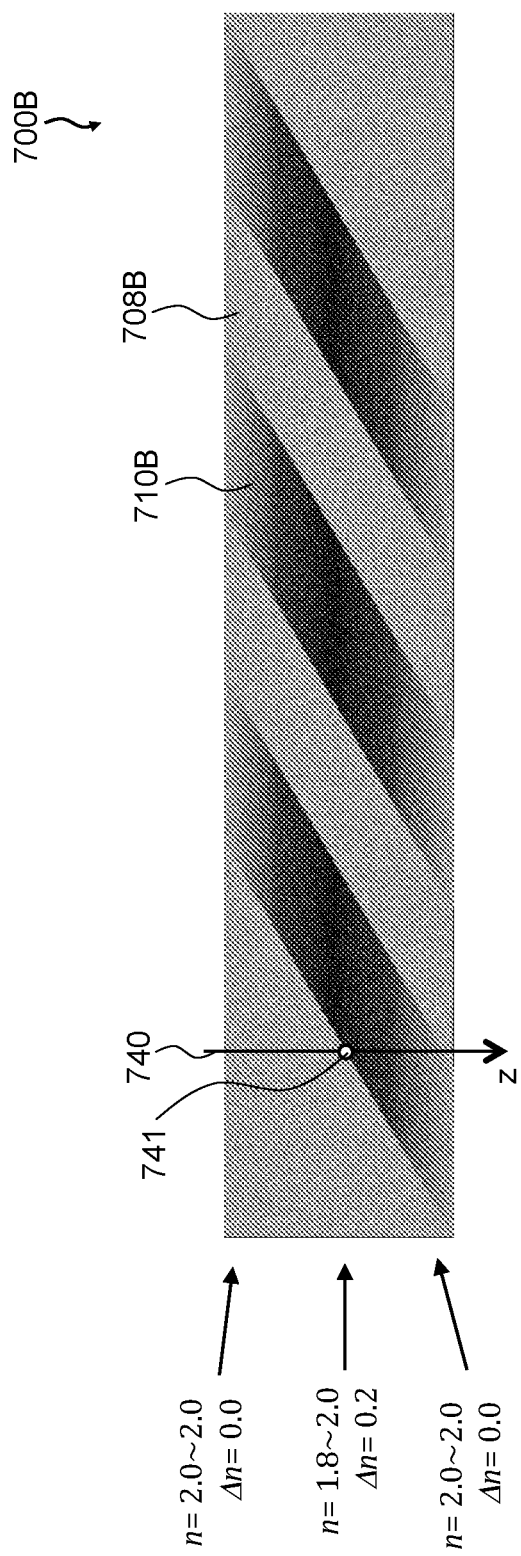
FIG. 7B is a refractive index map of a diffraction grating of a pupil replication waveguide, the diffraction grating including index-graded substrate.

Referring to FIG. 7B, a diffraction grating 700B for a pupil replication waveguide, e.g. the pupil replication waveguide 100 of FIG. 1, includes a plurality of slanted fringes 708B of high refractive index suspended in a substrate material 710B of low refractive index. As in examples above, the terms "high" and "low" are relative to one another, i.e. the fringe refractive index is lower than the substrate refractive index. The fringes 708B have a constant refractive index of 2.0 in this example. Refractive index of the substrate material 710B smoothly varies in a thickness direction 740. The refractive index of the substrate material 710B is lower at a middle point 741 of the thickness than at top and bottom surfaces of the diffraction grating 700B. The minimum refractive index at the middle point 741 is 1.8, and the refractive index at the top and bottom surfaces is 2.0. Accordingly, the refractive index profile of the diffraction grating 700B of FIG. 7B has a same or similar bell shape as the diffraction grating 700A of FIG. 7A, with the maximum of 0.2 at the middle point 741 and minimum of 0 at outer surfaces of the diffraction grating 700B.

Referring now to FIG. 8A, a Bragg grating 800 for a pupil replication waveguide, e.g. the pupil replication waveguide 100 of FIG. 1, includes a plurality of slanted sinusoidal fringes 808 of a refractive index varying from 1.8 to 2.0. Herein, the term "sinusoidal fringes" means diffraction grating fringes that have refractive index varying along a fringe direction 850 perpendicular to the fringes 808 sinusoidally, e.g. with an amplitude of 0.2 in this example (1.8 to 2.0). The refractive index contrast is the same across the entire Bragg grating 800.

In some embodiments, the Bragg grating 800 may be formed by providing a two-beam optical interference pattern in a photosensitive material, which changes its index of refraction upon illumination. Ultraviolet (UV) light may be used to form the two-beam optical interference pattern in a UV-sensitive polymer or another material. The two-beam interference pattern may be formed by directing two recording UV beams to the photosensitive substrate. The orientations of the recording beams may be selected to cause as much light as possible to diffract in a direction of an eyebox of a near-eye display. In some embodiments, a plurality of such exposures may be performed at different angles; for such cases, the resulting fringe pattern may be non-sinusoidal and/or irregularly shaped to diffract the display light with high efficiency at a plurality of angles of incidence corresponding to the plurality of exposing angles.

FIG. 8B shows a result of computing the blazed diffraction order diffraction efficiency 814 vs. angle of incidence at the diffraction grating 800 of FIG. 8A. Vertical lines 802 denote an angular range within which the display light is guided by the waveguide slab supporting the diffraction grating 800, e.g. the slab 102 of the pupil replication waveguide 100 of FIG. 1. In this example, the blazed diffraction order diffraction efficiency 814 of FIG. 8B (i.e. to the eyebox of the near-eye display) reaches about 18%.

FIG. 8C shows a result of computing the non-blazed diffraction order diffraction efficiency 816 vs. angle of incidence for the diffraction grating 800 of FIG. 8A. The computed non-blazed diffraction order diffraction efficiency 816, shown in FIG. 8C, reaches only about 0.4%. Even though this does not seem much as compared to the blazed diffraction order diffraction efficiency 814, 0.4% of incoming display light may become quite noticeable to outside observers of a near-eye display using such a pupil replication waveguide. Thus, a non-apodized refractive index contrast may result in a significant leaking of display light outside of the near-eye display, even for cases where the refractive index variation of the diffraction grating fringes is smooth, e.g. sinusoidal.

Turning to FIG. 9A, a Bragg grating 900 for a pupil replication waveguide, e.g. the pupil replication waveguide 100 of FIG. 1, includes a plurality of slanted sinusoidal fringes 908 running through a stack of first 921, second 922, and third 923 grating layers. A relative permittivity of the diffraction grating 900 is plotted against x- and z-coordinates in micrometers. The x-coordinate is a lateral coordinate, and the z-coordinate is a thickness coordinate of a particular location within the diffraction grating 900. In other words, the z-coordinate is parallel to a thickness direction 940. The second grating layer 922 of the diffraction grating 900 is disposed in the middle, i.e. between the first 921 and second 923 grating layers of the diffraction grating 900. The first 921 and third 923 grating layers have a same thickness, and the second (middle) layer 922 is approximately twice as thick as each one of the first 921 and third 923 grating layers. In this example, the thickness of the first 921 and third 923 grating layer is between 75 nm and 85 nm, and the thickness of the second grating layer 922 is between 150 nm and 170 nm.

The amplitude of sinusoidal variation of the refractive index in the fringes 908, i.e. the refractive index contrast, is different in different grating layers. In the example shown, the index contrast of the first 921 and third 923 grating layers is 0.1 with the refractive index spatially varying form 1.85 to 1.95, and the index contrast of the second grating layer 922 is 0.2 with the refractive index spatially varying form 1.8 to 2.00. Such a variation pattern may be obtained, for example, by stacking together the first 921, second 922, and third 923 grating layers, with the second grating layer 922 having a higher higher concentration of the photosensitive material than the first 921 and third 923 grating layers, and simultaneously irradiating the stack with two writing UV waves to create a writing UV interference pattern extending across all three grating layers. One may also use apodize the beam intensity to be the strongest in the middle of the grating.

Referring to FIG. 9B, a computed diffraction efficiency 914 for a blazed diffraction order reaches about 17%, which is slightly lower than the blazed diffraction order diffraction efficiency 814 (FIG. 8B) of the Bragg grating 800 of FIG. 8A. The slightly lower value of maximum diffraction efficiency may be caused by a lower overall refractive index contrast Δn, due to the fact that only the middle, the second layer 922 has the refractive index contrast Δn of 0.2, and the first 921 and third 923 grating layers have the lower refractive index contrast Δn of 0.1. Notably, the maximum diffraction efficiency 916 for the non-blazed diffraction order is reduced much more dramatically, to below 0.1%, i.e. at least 4 times, within the angular range of the waveguide 900 outlined with the boundary lines 902 (FIGS. 9B, 9C) denoting an angular range for light guided by the pupil replication waveguide. Thus, the apodization of the z-profile of the refractive index contrast Δn of the diffraction grating 900 of FIG. 9A lessens the portion of the display light out-coupled into the non-blazed diffraction order 916 (FIG. 9C), to a higher degree tan the refractive index contrast of the blazed portion 914. The behavior of the non-blazed diffraction efficiency 916 of the Bragg grating 900 is similar to the non-blazed diffraction efficiency 416 of the Bragg grating 400 of FIG. 4A.

Figure 10:
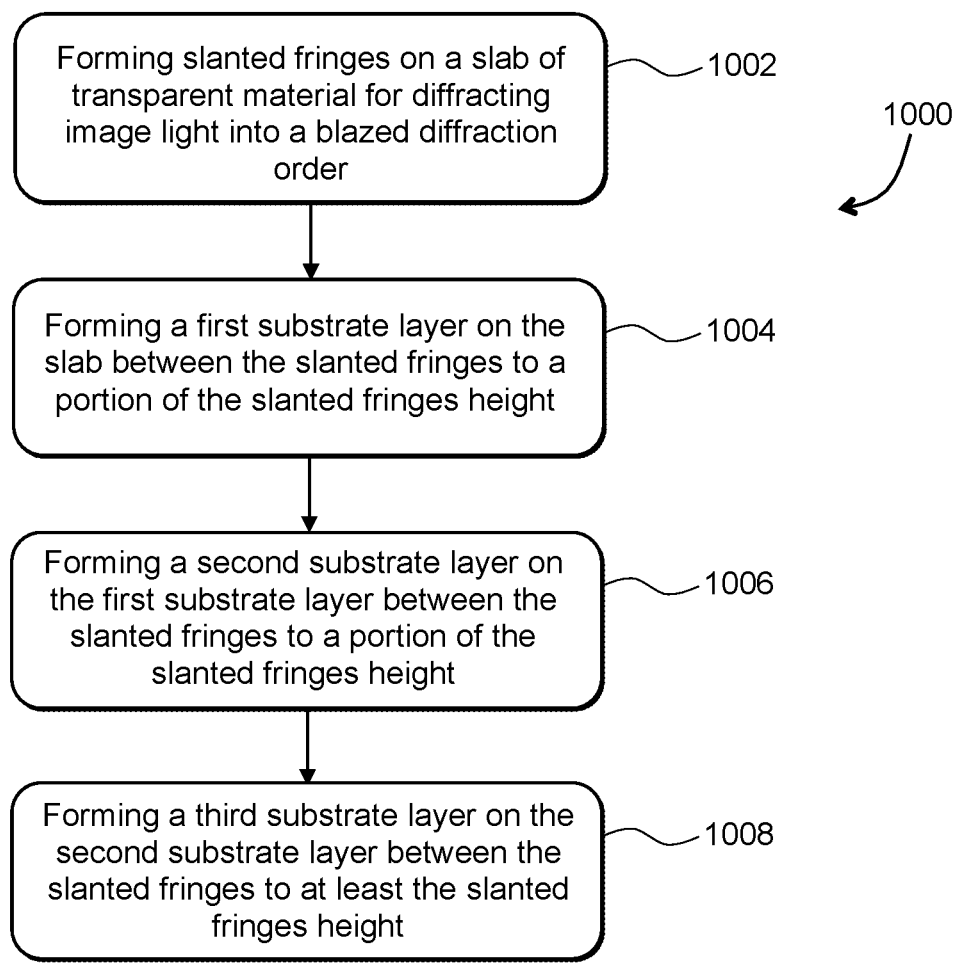
FIG. 10 is a flow chart of a method of manufacturing a pupil replication waveguide including several grating layers with different refractive index contrast.

Referring now to FIG. 10, a method 1000 of manufacturing a pupil replication waveguide includes forming (1002) a plurality of slanted fringes, e.g. the slanted fringes 608 of FIG. 6A, on a slab of transparent material, e.g. the slab 102 of FIG. 1. The slanted fringes may be configured for out-coupling display light from the slab by diffraction into a blazed diffraction order. For example, the slanted fringes may have a tilt angle selected to increase the amount of light diffracted into the blazed diffraction order, e.g. the tilt angle corresponding to a specular reflection in the direction of the blazed diffraction order. A first substrate layer may then be formed (FIG. 10; 1004), e.g. coated, on the slab between the slanted fringes to a portion of the fringes height, thereby forming the first grating layer 621 (FIG. 6A). A second substrate layer may then be formed e.g. by coating (FIG. 10; 1006) on the first substrate layer between the slanted fringes to a portion of the fringes height, thereby forming the second grating layer 622 (FIG. 6A). A third substrate layer may then be formed, e.g. coated (FIG. 10; 1008) on the second substrate layer between the slanted fringes to at least the height of the fringes, thereby forming the third grating layer 623 (FIG. 6A). The first, second, and third substrate layers together form the substrate 610. A refractive index contrast of the second grating layer 622, i.e. the layer formed by the fringes 608 and the second substrate layer, is higher than a refractive index contrast of the first grating layer 621, i.e. the layer formed by the fringes 608 and the first substrate layer. The refractive index contrast of the second grating layer is also higher than a refractive index contrast of the third grating layer, i.e. the layer formed by the slanted fringes and the third substrate layer.

The plurality of slanted fringes may be formed by a suitable deposition method, for example standard and/or selective atomic layer deposition (ALD), chemical vapor deposition (CVD), plasma-enhanced chemical vapor deposition (PECVD), and or physical vapor deposition (PVD) in conjunction with plasma etch or vapor etch or wet etch or atomic layer etch (ALE). The deposition may be followed by masked directional etching, for example. In some embodiments, the first, second, and third substrate layers are formed by at spin-on process where polymer materials with suitable refractive indices are spin-coated onto one another, to form a stack of varying refractive index. An intermediate etch or lithographic exposure-and-develop step might be included to control the relative thickness in z-direction as well as in X and Y directions. An inkjet or a flowable deposition process may also be used for this purpose instead of spin-coating.

Figure 11:
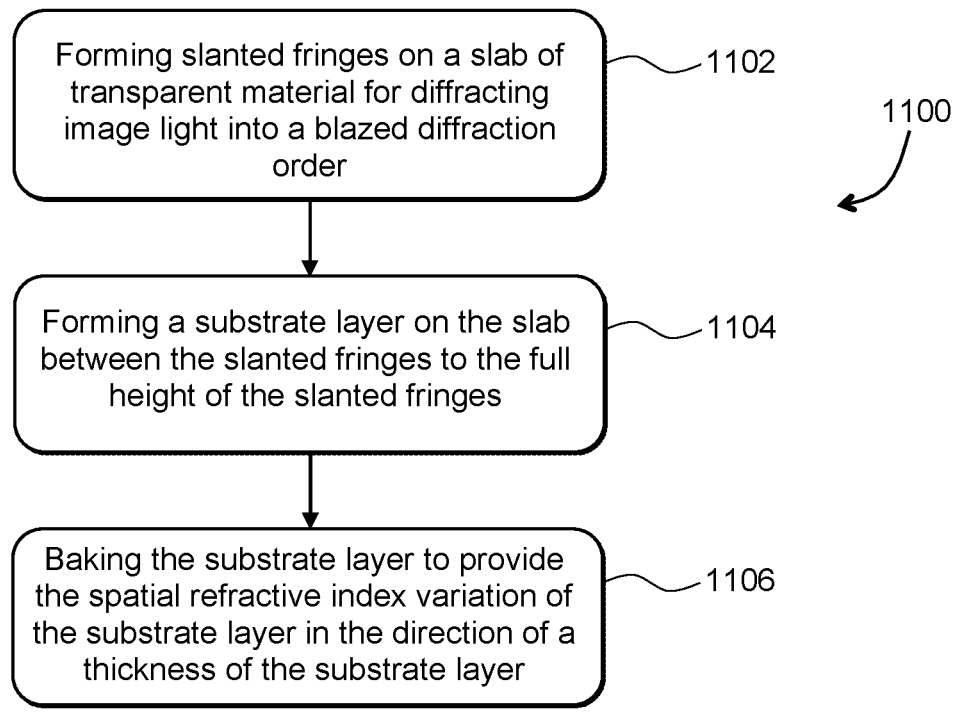
FIG. 11 is a flow chart of a method of manufacturing a pupil replication waveguide including a diffraction grating with smoothly varying refractive index contrast.

Referring to FIG. 11, a method 1100 of manufacturing a pupil replication waveguide includes forming (1102) on a slab of transparent material, e.g. the slab 102 of FIG. 1, a plurality of slanted fringes, e.g. the slanted fringes 708B of FIG. 7B. The slanted fringes may be configured for out-coupling display light from the slab by diffraction into a blazed diffraction order. For example, the slanted fringes may have a tilt angle selected to increase the amount of light diffracted into the blazed diffraction order, e.g. the tilt angle corresponding to a specular reflection in the direction of the blazed diffraction order. A substrate layer, e.g. the substrate layer 710B of FIG. 7B, may then be formed (FIG. 11; 1104) on the slab between the fringes 708B to at least the full height of the fringes 708B. The substrate layer 710B may then be baked (1106) to provide a spatial refractive index variation of the substrate layer 710B in the direction 740 of a thickness of the substrate layer, such that the refractive index contrast profile of the diffraction grating 700B formed by the fringes 708B and the substrate layer 710B along the thickness direction 740 of the diffraction grating 700B is symmetrical, and the refractive index contrast is larger at the middle 741 than at both sides of the refractive index contrast profile.

The plurality of slanted fringes may be formed by a suitable deposition method, for example atomic layer deposition (ALD), chemical vapor deposition (CVD), plasma-enhanced chemical vapor deposition (PECVD), and or physical vapor deposition (PVD). The deposition may be followed by masked directional etching, for example. In some embodiments, the first, second, and third substrate layers are formed by at spin-on process where polymer materials with suitable refractive indices are spin-coated onto one another. An inkjet or a flowable deposition process may also be used for this purpose.

Figure 12:
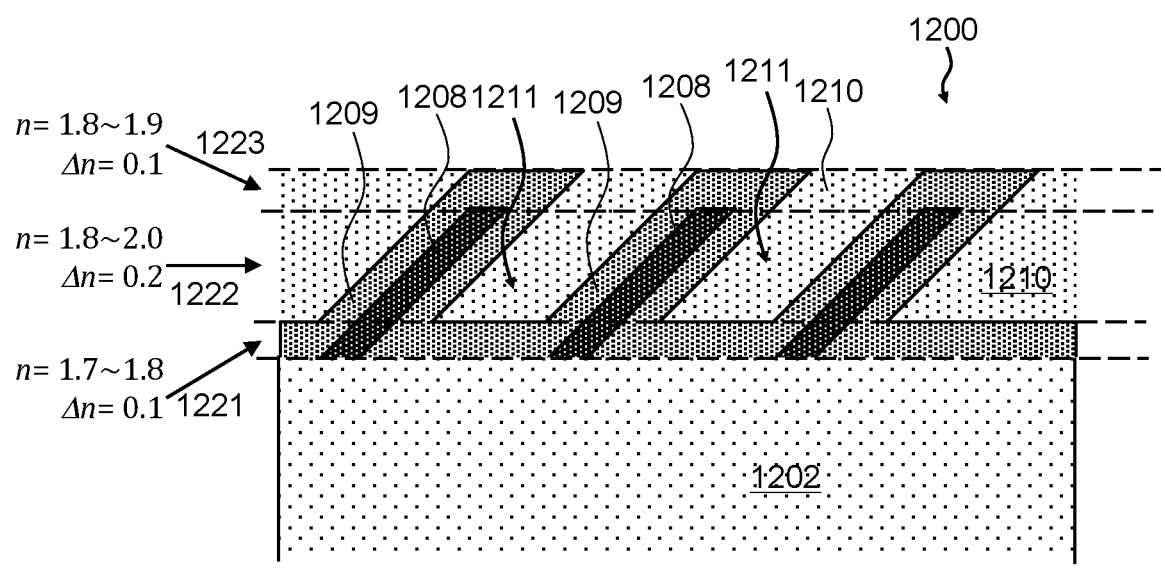
FIG. 12 is a cross-sectional view of a diffraction grating for a pupil replication waveguide, the diffraction grating having a conforming layer.

Turning now to FIG. 12, a pupil replication waveguide 1200 includes a plurality of slanted fringes 1208 supported by a slab 1202 of transparent material configured for guiding display light in the slab 1202 by TIR. Similarly to pupil replication waveguide examples considered above, the slanted fringes 1208 of the pupil replication waveguide 1200 are configured for out-coupling display light from the slab 102 by diffraction into a blazed diffraction order. The slanted fringes 1208 have a first refractive index $n_1$.

A conforming layer 1209 covers the slanted fringes 1208 to a uniform thickness. In other words, the conforming layer 1209 repeats the shape of the slanted fringes 1208, encapsulating individual slanted fringes 1208, while leaving gaps 1211 between the individual slanted fringes 1208, as shown. The conforming layer has a second refractive index $n_2$.

An overcoat layer 1210, e.g. a polymer layer, fills the gals 1211 between the slanted fringes 1208 covered with the conforming layer 1209. The top surface of the overcoat layer 1210 may be flat. The overcoat layer 1210 has a third refractive index $n_3$. In some embodiments, the first $n_1$, second $n_2$, and third $n_3$ refractive indices fulfill the condition $n_1 < n_2 < n_3$. In the example shown in FIG. 12, $n_1 = 1.7$, $n_2 = 1.8$, and $n_3 = 1.9$.

Effectively, the slanted fringes 1208, the conforming layer 1209, and the overcoat layer 1210 form three grating layers in the pupil replication waveguide 1200: a first grating layer 1221, a second grating layer 1222, and a third grating layer 1223 (dashed horizontal lines in FIG. 12). The first grating layer 1221 has the refractive index varying from $n_1$ to $n_2$, that is, from 1.7 to 1.8 in this example. Thus, the effective refractive index contrast $\Delta n$ of the first grating layer 1221 is equal to 0.1. The second grating layer 1222 has the refractive index varying from $n_1$ to $n_2$ to $n_3$, that is, from 1.7 to 1.8 to 1.9 in this example. Thus, the effective refractive index contrast $\Delta n$ of the second grating layer 1222 is equal to 0.2. Finally, the third grating layer 1223 has the refractive index varying from $n_2$ to $n_3$, that is, from 1.8 to 1.9 in this example. Thus, the effective refractive index contrast $\Delta n$ of the third grating layer 1223 is equal to 0.1. Therefore, such a configuration also provides an apodized refractive index contrast of the diffraction grating similar to ones considered above, i.e. 0.1-0.2-0.1.

Figure 13:
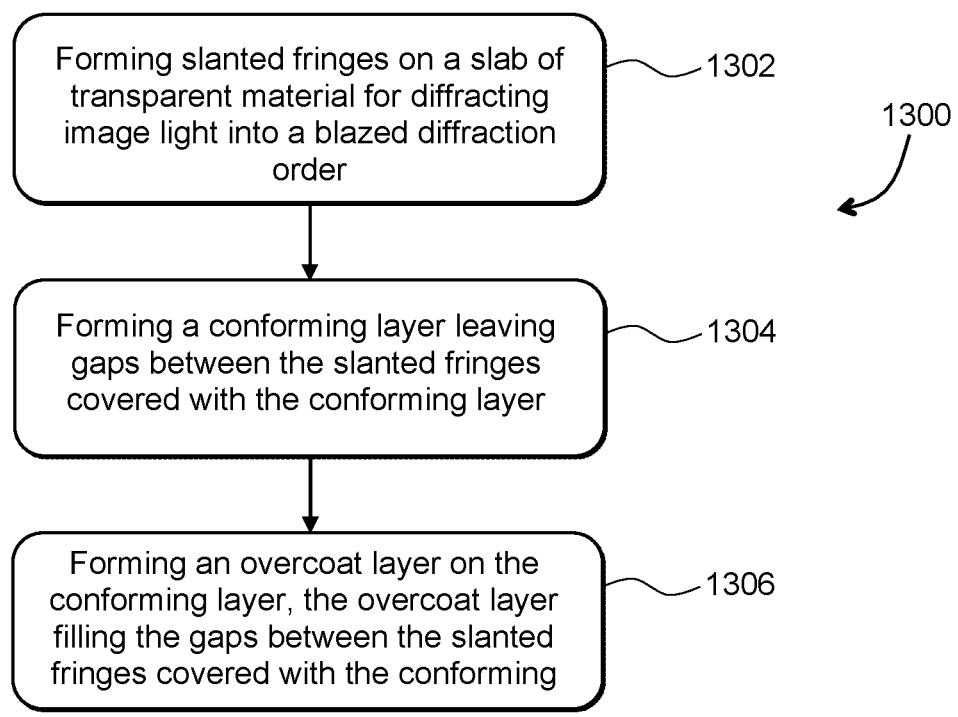
FIG. 13 is a flow chart of a method of manufacturing the diffraction grating of FIG. 12.

Turning to FIG. 13 with further reference to FIG. 12, a method 1300 of manufacturing a pupil replication waveguide, such as the pupil replication waveguide 1200 of FIG. 12 for example, includes forming (1302) the plurality of slanted fringes 1208 on the slab 1202 for out-coupling display light from the slab 1202 by diffraction into a blazed diffraction order, the slanted fringes having the first refractive index $n_1$. The conforming layer 1209 having the refractive index $n_2$ is then formed (1304) on the plurality of slanted fringes 1208, such that the gaps 1211 are left between the individual slanted fringes 1208. The overcoat layer 1210 having the refractive index $n_3$ may then be formed (1306) on the conforming layer 1209. The overcoat layer 1210 fills the gaps 1211 between the slanted fringes 1208 covered with the conforming layer 1209, as shown in FIG. 12. The indices of refraction of the slanted fringes 1208, the conforming layer 1209, and the overcoat layer 1210 may fulfill the condition $n_1 > n_2 > n_3$ or, alternatively, $n_1 < n_2 < n_3$.

A variety of manufacturing methods may be employed to fabricate the slanted fringes 1208, the conforming layer 1209, and the overcoat layer 1210. In some embodiments, the plurality of slanted fringes 1208 are formed by imprinting using a mold and a suitable resin, or anisotropic etching through a photolithographically defined mask. The conforming layer 1209 may be formed by atomic layer deposition, which enables deposition of conforming films of well-defined uniform thickness. The overcoat layer 1210 may be formed e.g. by spin-coating, which fills the gaps 1211 and results in a good uniformity of the upper surface of the spin-coated overcoat layer.

Figure 14:
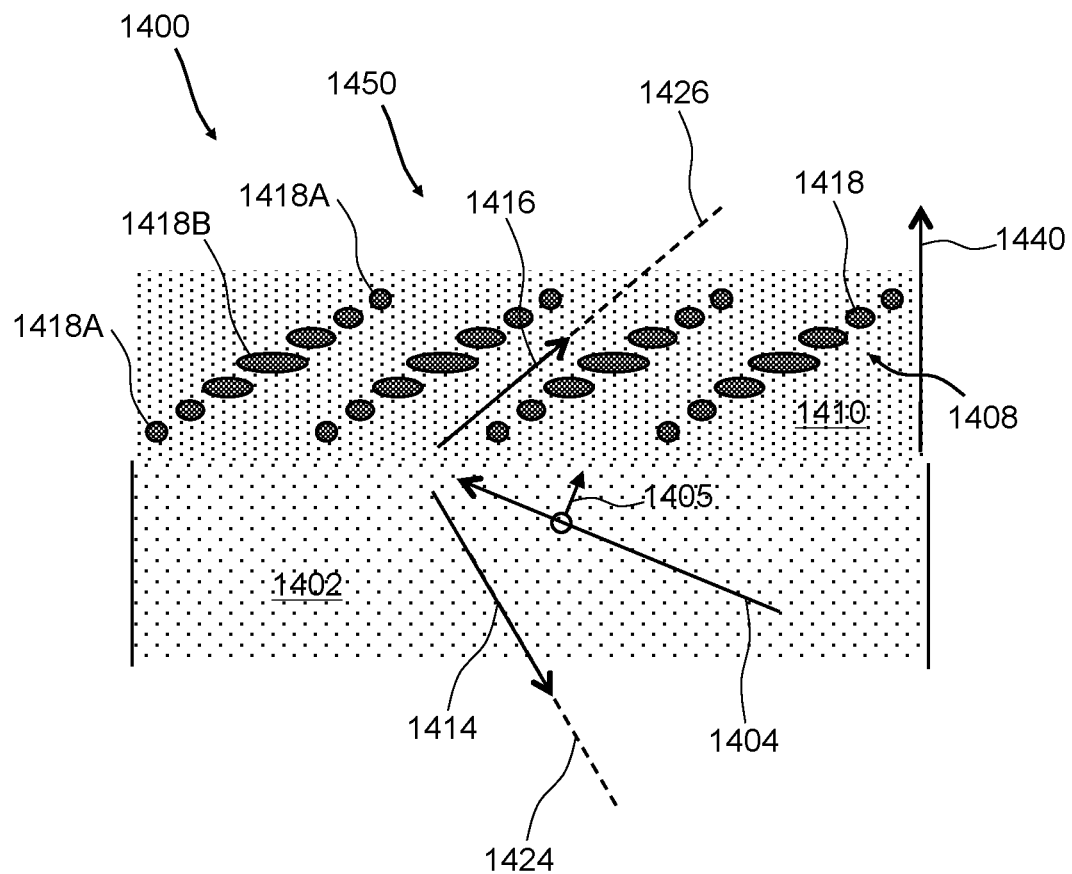
FIG. 14 is a cross-sectional view of a diffraction grating for a pupil replication waveguide, the diffraction grating including fringes formed with twisted nematic (TN) liquid crystals.

Referring to FIG. 14, a pupil replication waveguide 1400 includes a slab 1402 of a transparent material for propagating display light in the slab 1402 by total internal reflection (TIR) from top and bottom surfaces of the slab 1402. A diffraction grating 1450 is supported by the slab 1402. The diffraction grating 1450 includes a plurality of fringes 1408 suspended in a substrate material 1410, e.g. a polymer substrate. The fringes 1408 are formed by a twisted nematic (TN) liquid crystal (LC) material. In some embodiments, LC molecules 1418 are stabilized by the polymer substrate material. The fringes 1408 are slanted for out-coupling display light 1404 from the slab 1402 by diffraction into a blazed diffraction order 1424. Due to the slant of the fringes 1408, a greater portion 1414 of display light 1404 is out-coupled into the blazed diffraction order 1424, and a smaller portion 1416 of the display light 1404 is out-coupled into a non-blazed diffraction order 1426.

The TN LC material has an ordinary refractive index $n_O$ for light polarized perpendicular to the elongated LC molecules 1418 of the TN LC material, and an extraordinary refractive index $n_E$ for light polarized parallel to the molecules 1418 of the TN LC material. In some embodiments, a refractive index material of the polymer substrate 1410 is closer to $n_O$ than to $n_E$. For these embodiments, a refractive index contrast for the impinging display light 1404 polarized in the plane of incidence, i.e. in the plane of FIG. 14, has a varying refractive index contrast profile along a thickness direction 1440 of the diffraction grating 1450. This happens because in the TN configuration of the LC material shown in FIG. 14, top and bottom LC molecules 1418A are disposed perpendicular to a polarization direction 1405 of the impinging display light 1404 and therefore have the ordinary refractive index $n_O$ for the impinging display light 1404, while middle-thickness LC molecules 1418B are at an acute angle w.r.t. the polarization direction 1405, and therefore have a refractive index between $n_O$ and $n_E$ for the impinging display light 1404, which is typically higher than the ordinary refractive index $n_O$. Consequently, a refractive index contrast is larger at a middle than at both sides of the refractive index contrast profile, which lessens the portion of the polarized display light out-coupled into the non-blazed diffraction order 1426. Due to the smoothly varying twist angle of the TN LC molecules 1418, the refractive index contrast profile is typically a smoothly varying function. By selecting proper LC molecules orientation geometry, the smoothly varying function may be made to approximate a Gaussian function.

Figure 15:
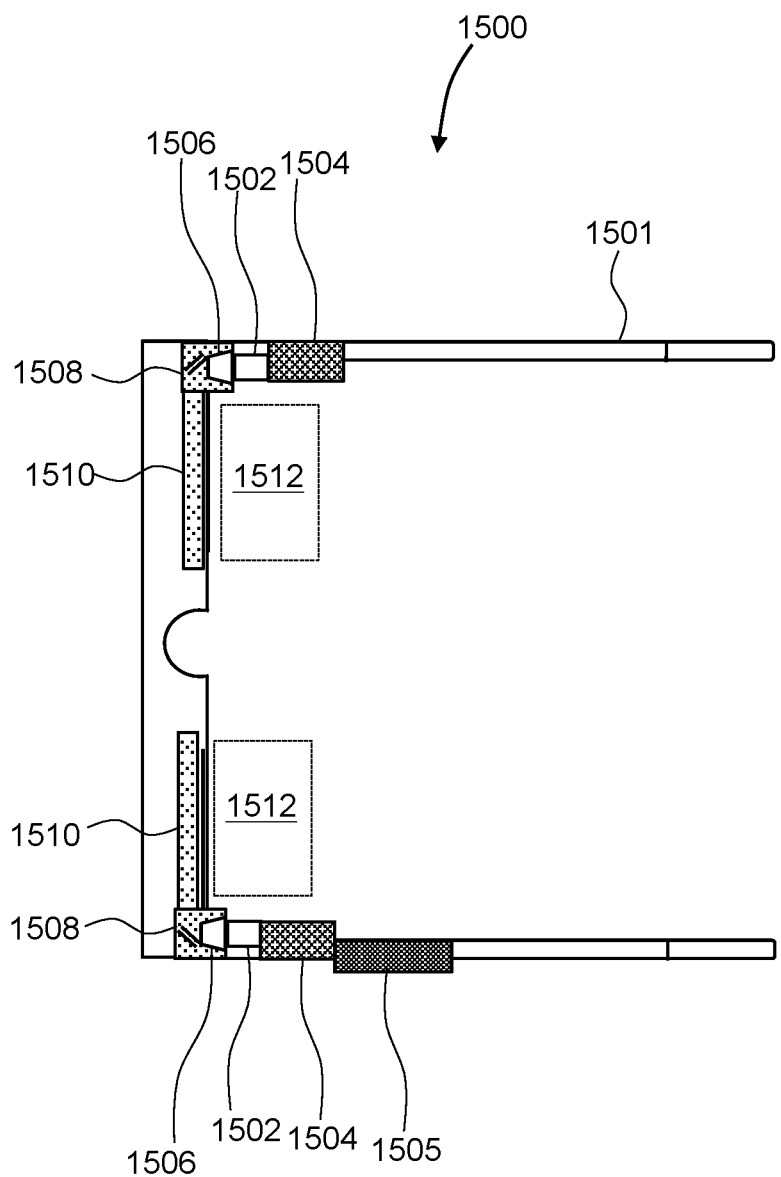
FIG. 15 is a top cross-sectional view of a near-eye display having a form factor of eyeglasses.

Referring to FIG. 15, a near-eye display 1500 includes a frame 1501 having a form factor of a pair of eyeglasses. The frame 1501 supports, for each eye: a light source subassembly 1502, an electronic driver 1504 operably coupled to the light source subassembly 1502 for powering emitters of the light source subassembly 1502 for providing a plurality of light beams, a collimator 1506 optically coupled to light source subassembly 1502 for collimating the plurality of light beams, a scanner 1508 optically coupled to the collimator 1506 for scanning the plurality of light beams, and a pupil replicator 1510 optically coupled to the scanner 1508. The light source subassembly 1502 may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The collimators 1506 may include a concave mirror, a bulk lens, a Fresnel lens, a holographic lens, etc., and may be integrated with the light source subassembly 1502. The scanners 1508 may include a 2D microelectromechanical system (MEMS) scanner, for example.

The function of the pupil replicators 1510 is to provide multiple laterally offset copies of the light beams scanned by the scanner 1508, to cover the entire area of eyeboxes 1512. The eyeboxes 1512 denote geometrical areas for placing the user's eyes when a user wears the near-eye display 1500. When the user's eyes are located in the areas outlined by the eyeboxes 1512, an image of acceptable quality may be displayed to the user. The multiple laterally offset copies of the light beams are provided by the pupil replicators 1510 to ensure that the area of the eyeboxes 1512 is wide enough for convenient observation of the displayed imagery by different users. The pupil replicators 1510 may include any of the pupil replication waveguides described herein, such as the pupil replication waveguide 100 of FIG. 1 including the diffraction grating 400 of FIG. 4A, the diffraction grating 500 of FIG. 5A, the diffraction grating 600 of FIG. 6A, the diffraction grating 700A of FIG. 7A, the diffraction grating 700B of FIG. 7B, the diffraction grating 900 of FIG. 9A, and/or the diffraction grating 1550 of FIG. 15. The pupil replicators 1510 may also include the pupil replication waveguide 1200 of FIG. 12, the pupil replication waveguide 1400 of FIG. 14, the pupil replication waveguide 1400 of FIG. 14, and the like.

A controller 1505 (FIG. 15) is operably coupled to the scanners 1508 and the electronic drivers 1504. The controller 1505 may be configured for determining the X- and Y-tilt angles of tiltable MEMS reflectors of the scanners 1508. Then, the controller 1505 determines which pixel or pixels of the image to be displayed correspond to the determined X- and Y-tilt angles. Then, the controller 1505 determines the brightness and/or color of these pixels, and operates the electronic drivers 1504 accordingly for providing powering electric pulses to the light source subassemblies 1502 to produce light pulses at power level(s) corresponding to the determined pixel brightness and color.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 16A:
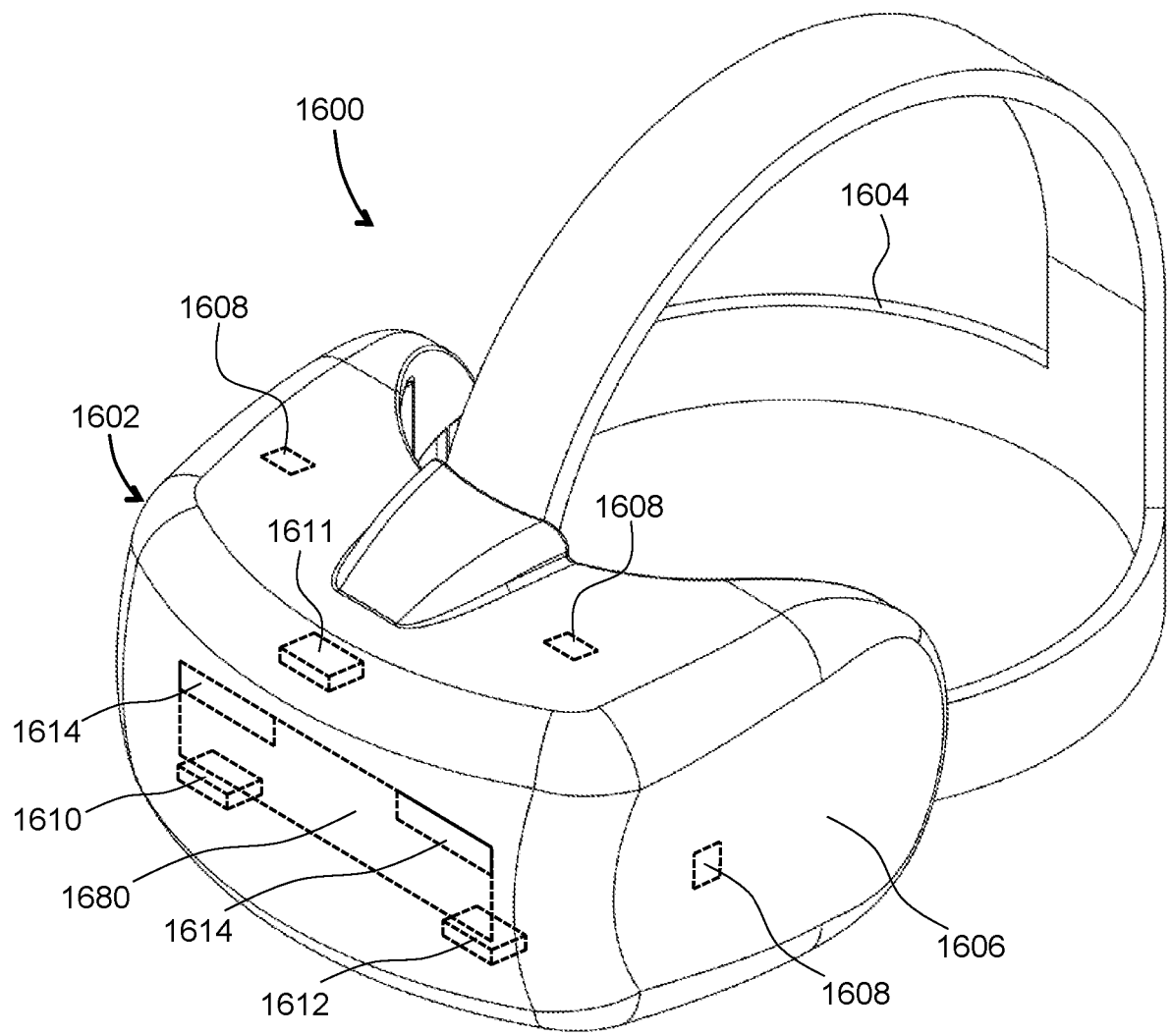
FIG. 16A is an isometric view of a head-mounted display of the present disclosure.

Referring to FIG. 16A, an HMD 1600 is an example of an AR/VR wearable display system which encloses the user's face, for a greater degree of immersion into the AR/VR environment. The HMD 1600 is an embodiment of near-eye display 1500 of FIG. 15, and may include similar elements. The function of the HMD 1600 is to augment views of a physical, real-world environment with computer-generated imagery, and/or to generate the entirely virtual 3D imagery. The HMD 1600 may include a front body 1602 and a band 1604. The front body 1602 is configured for placement in front of eyes of a user in a reliable and comfortable manner, and the band 1604 may be stretched to secure the front body 1602 on the user's head. A display system 1680 may be disposed in the front body 1602 for presenting AR/VR imagery to the user. The display system 1680 may include any of the pupil replication waveguides and diffraction gratings disclosed herein. Sides 1606 of the front body 1602 may be opaque or transparent.

In some embodiments, the front body 1602 includes locators 1608 and an inertial measurement unit (IMU) 1610 for tracking acceleration of the HMD 1600, and position sensors 1612 for tracking position of the HMD 1600. The IMU 1610 is an electronic device that generates data indicating a position of the HMD 1600 based on measurement signals received from one or more of position sensors 1612, which generate one or more measurement signals in response to motion of the HMD 1600. Examples of position sensors 1612 include: one or more accelerometers, one or more gyroscopes, one or more magnetometers, another suitable type of sensor that detects motion, a type of sensor used for error correction of the IMU 1610, or some combination thereof. The position sensors 1612 may be located external to the IMU 1610, internal to the IMU 1610, or some combination thereof.

The locators 1608 are traced by an external imaging device of a virtual reality system, such that the virtual reality system can track the location and orientation of the entire HMD 1600. Information generated by the IMU 1610 and the position sensors 1612 may be compared with the position and orientation obtained by tracking the locators 1608, for improved tracking accuracy of position and orientation of the HMD 1600. Accurate position and orientation is important for presenting appropriate virtual scenery to the user as the latter moves and turns in 3D space.

The HMD 1600 may further include a depth camera assembly (DCA) 1611, which captures data describing depth information of a local area surrounding some or all of the HMD 1600. To that end, the DCA 1611 may include a laser radar (LIDAR), a phase-sensitive depth camera, or a similar device. The depth information may be compared with the information from the IMU 1610, for better accuracy of determination of position and orientation of the HMD 1600 in 3D space.

The HMD 1600 may further include an eye tracking system 1614 for determining orientation and position of user's eyes in real time. The obtained position and orientation of the eyes also allows the HMD 1600 to determine the gaze direction of the user and to adjust the image generated by the display system 1680 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1602.

Figure 16B:
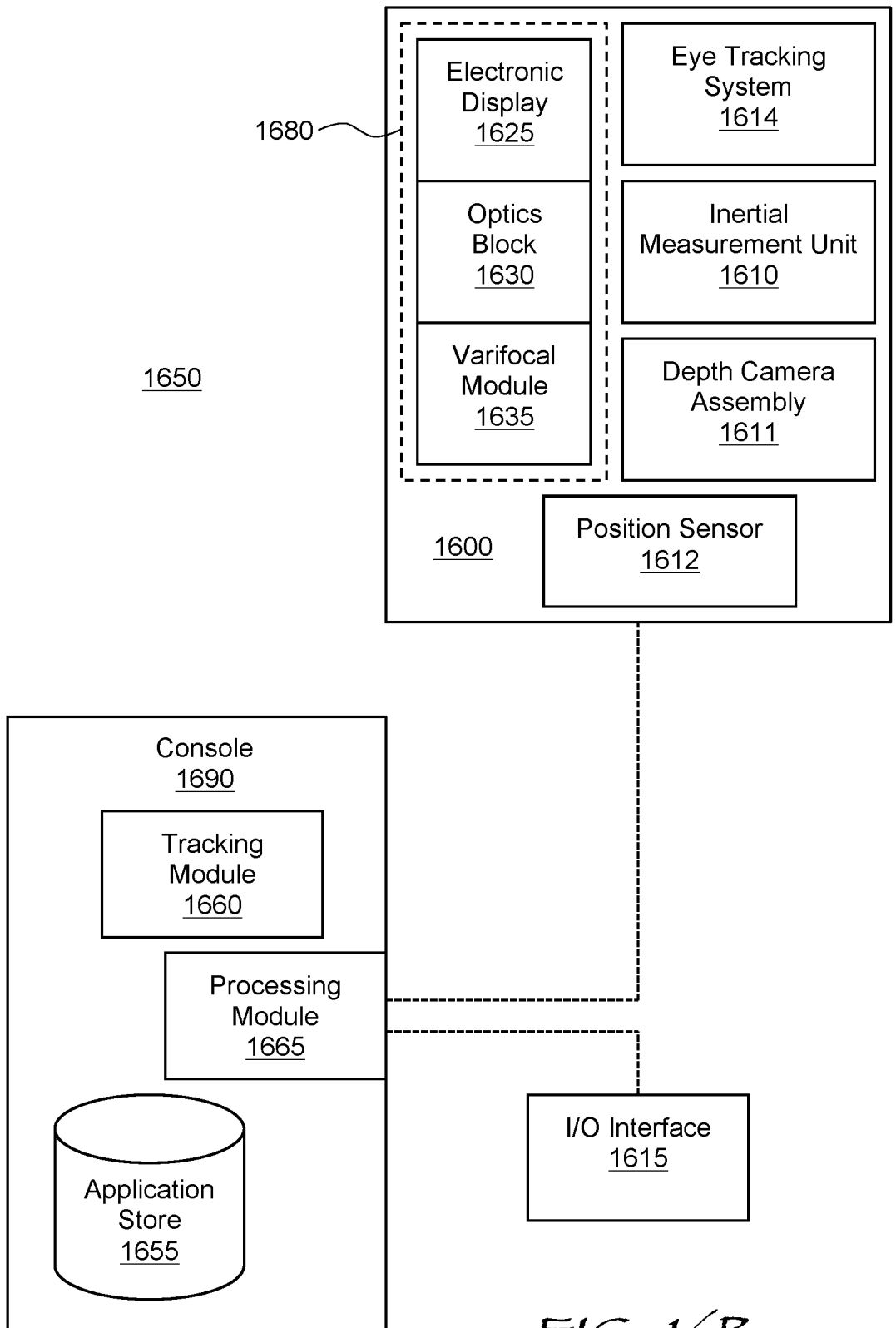
FIG. 16B is a block diagram of a virtual reality system including the headset of FIG. 16A.

Referring to FIG. 16B, an AR/VR system 1650 includes the HMD 1600 of FIG. 16A, an external console 1690 storing various AR/VR applications, setup and calibration procedures, 3D videos, etc., and an input/output (I/O) interface 1615 for operating the console 1690 and/or interacting with the AR/VR environment. The HMD 1600 may be "tethered" to the console 1690 with a physical cable, or connected to the console 1690 via a wireless communication link such as Bluetooth®, Wi-Fi, etc. There may be multiple HMDs 1600, each having an associated I/O interface 1615, with each HMD 1600 and I/O interface(s) 1615 communicating with the console 1690. In alternative configurations, different and/or additional components may be included in the AR/VR system 1650. Additionally, functionality described in conjunction with one or more of the components shown in FIGS. 16A and 16B may be distributed among the components in a different manner than described in conjunction with FIGS. 16A and 16B in some embodiments. For example, some or all of the functionality of the console 1615 may be provided by the HMD 1600, and vice versa. The HMD 1600 may be provided with a processing module capable of achieving such functionality.

As described above with reference to FIG. 16A, the HMD 1600 may include the eye tracking system 1614 (FIG. 16B) for tracking eye position and orientation, determining gaze angle and convergence angle, etc., the IMU 1610 for determining position and orientation of the HMD 1600 in 3D space, the DCA 1611 for capturing the outside environment, the position sensor 1612 for independently determining the position of the HMD 1600, and the display system 1680 for displaying AR/VR content to the user. The display system 1680 includes (FIG. 16B) an electronic display 1625, for example and without limitation, a scanning projector display. The display system 1680 further includes an optics block 1630, whose function is to convey the images generated by the electronic display 1625 to the user's eye. The optics block 1630 may include pupil replication waveguides and diffraction gratings disclosed herein. The optics block 1630 may further include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1680 may further include a varifocal module 1635, which may be a part of the optics block 1630. The function of the varifocal module 1635 is to adjust the focus of the optics block 1630 e.g. to compensate for vergence-accommodation conflict, to correct for vision defects of a particular user, to offset aberrations of the optics block 1630, etc.

The I/O interface 1615 is a device that allows a user to send action requests and receive responses from the console 1690. An action request is a request to perform a particular action. For example, an action request may be an instruction to start or end capture of image or video data or an instruction to perform a particular action within an application. The I/O interface 1615 may include one or more input devices, such as a keyboard, a mouse, a game controller, or any other suitable device for receiving action requests and communicating the action requests to the console 1690. An action request received by the I/O interface 1615 is communicated to the console 1690, which performs an action corresponding to the action request. In some embodiments, the I/O interface 1615 includes an IMU that captures calibration data indicating an estimated position of the I/O interface 1615 relative to an initial position of the I/O interface 1615. In some embodiments, the I/O interface 1615 may provide haptic feedback to the user in accordance with instructions received from the console 1690. For example, haptic feedback can be provided when an action request is received, or the console 1690 communicates instructions to the I/O interface 1615 causing the I/O interface 1615 to generate haptic feedback when the console 1690 performs an action.

The console 1690 may provide content to the HMD 1600 for processing in accordance with information received from one or more of: the IMU 1610, the DCA 1611, the eye tracking system 1614, and the I/O interface 1615. In the example shown in FIG. 16B, the console 1690 includes an application store 1655, a tracking module 1660, and a processing module 1665. Some embodiments of the console 1690 may have different modules or components than those described in conjunction with FIG. 16B. Similarly, the functions further described below may be distributed among components of the console 1690 in a different manner than described in conjunction with FIGS. 16A and 16B.

The application store 1655 may store one or more applications for execution by the console 1690. An application is a group of instructions that, when executed by a processor, generates content for presentation to the user. Content generated by an application may be in response to inputs received from the user via movement of the HMD 1600 or the I/O interface 1615. Examples of applications include: gaming applications, presentation and conferencing applications, video playback applications, or other suitable applications.

The tracking module 1660 may calibrate the AR/VR system 1650 using one or more calibration parameters and may adjust one or more calibration parameters to reduce error in determination of the position of the HMD 1600 or the I/O interface 1615. Calibration performed by the tracking module 1660 also accounts for information received from the IMU 1610 in the HMD 1600 and/or an IMU included in the I/O interface 1615, if any. Additionally, if tracking of the HMD 1600 is lost, the tracking module 1660 may re-calibrate some or all of the AR/VR system 1650.

The tracking module 1660 may track movements of the HMD 1600 or of the I/O interface 1615, the IMU 1610, or some combination thereof. For example, the tracking module 1660 may determine a position of a reference point of the HMD 1600 in a mapping of a local area based on information from the HMD 1600. The tracking module 1660 may also determine positions of the reference point of the HMD 1600 or a reference point of the I/O interface 1615 using data indicating a position of the HMD 1600 from the IMU 1610 or using data indicating a position of the I/O interface 1615 from an IMU included in the I/O interface 1615, respectively. Furthermore, in some embodiments, the tracking module 1660 may use portions of data indicating a position or the HMD 1600 from the IMU 1610 as well as representations of the local area from the DCA 1611 to predict a future location of the HMD 1600. The tracking module 1660 provides the estimated or predicted future position of the HMD 1600 or the I/O interface 1615 to the processing module 1665.

The processing module 1665 may generate a 3D mapping of the area surrounding some or all of the HMD 1600 ("local area") based on information received from the HMD 1600. In some embodiments, the processing module 1665 determines depth information for the 3D mapping of the local area based on information received from the DCA 1611 that is relevant for techniques used in computing depth. In various embodiments, the processing module 1665 may use the depth information to update a model of the local area and generate content based in part on the updated model.

The processing module 1665 executes applications within the AR/VR system 1650 and receives position information, acceleration information, velocity information, predicted future positions, or some combination thereof, of the HMD 1600 from the tracking module 1660. Based on the received information, the processing module 1665 determines content to provide to the HMD 1600 for presentation to the user. For example, if the received information indicates that the user has looked to the left, the processing module 1665 generates content for the HMD 1600 that mirrors the user's movement in a virtual environment or in an environment augmenting the local area with additional content. Additionally, the processing module 1665 performs an action within an application executing on the console 1690 in response to an action request received from the I/O interface 1615 and provides feedback to the user that the action was performed. The provided feedback may be visual or audible feedback via the HMD 1600 or haptic feedback via the I/O interface 1615.

In some embodiments, based on the eye tracking information (e.g., orientation of the user's eyes) received from the eye tracking system 1614, the processing module 1665 determines resolution of the content provided to the HMD 1600 for presentation to the user on the electronic display 1625. The processing module 1665 may provide the content to the HMD 1600 having a maximum pixel resolution on the electronic display 1625 in a foveal region of the user's gaze. The processing module 1665 may provide a lower pixel resolution in other regions of the electronic display 1625, thus lessening power consumption of the AR/VR system 1650 and saving computing resources of the console 1690 without compromising a visual experience of the user. In some embodiments, the processing module 1665 can further use the eye tracking information to adjust where objects are displayed on the electronic display 1625 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pupil replication waveguide comprising:
   a slab of transparent material for propagating display light therein via total internal reflection; and
   a diffraction grating supported by the slab and comprising a plurality of fringes formed by a twisted nematic (TN) liquid crystal (LC) material in a polymer substrate, wherein the fringes are slanted for out-coupling the display light from the slab by diffraction into a blazed diffraction order, wherein a greater portion of the display light is out-coupled into the blazed diffraction order, and a smaller portion of the display light is out-coupled into a non-blazed diffraction order;
   wherein the TN LC material has an ordinary refractive index $n_O$ for light polarized perpendicular to molecules of the TN LC material, and an extraordinary refractive index $n_E$ for light polarized parallel to the molecules of the TN LC material, wherein a refractive index contrast for polarized display light impinging onto the diffraction grating has a refractive index contrast profile along a thickness direction of the diffraction grating;

wherein a refractive index contrast is larger at a middle than at both sides of the refractive index contrast profile, whereby a portion of the impinging polarized display light out-coupled into the non-blazed diffraction order is lessened.

2. The pupil replication waveguide of claim 1, wherein a refractive index material of the polymer substrate is closer to $n_O$ than to $n_E$, whereby the refractive index contrast is larger at a middle than at both sides of the refractive index contrast profile.

3. The pupil replication waveguide of claim 1, wherein the refractive index contrast profile is symmetrical along the thickness direction of the diffraction grating.

4. The pupil replication waveguide of claim 1, wherein the refractive index contrast profile is substantially zero at both sides.

5. The pupil replication waveguide of claim 1, wherein the TN LC material is polymer-stabilized.

6. The pupil replication waveguide of claim 1, wherein the refractive index contrast profile is a smoothly varying function.

7. The pupil replication waveguide of claim 6, wherein the smoothly varying function is a Gaussian function.

8. The pupil replication waveguide of claim 1, further comprising an input grating for in-coupling the display light into the slab.

9. The pupil replication waveguide of claim 1, further comprising an output grating for out-coupling the display light from the slab.

10. A near-eye display (NED) comprising:
a light source for providing a plurality of light beams;
a collimator optically coupled to the light source for collimating the plurality of light beams;
a scanner optically coupled to the collimator for scanning the plurality of light beams collimated by the collimator; and
a pupil replication waveguide optically coupled to the scanner for receiving and providing, at an eyebox of the NED, multiple laterally offset copies of the light beams scanned by the scanner, the pupil replication waveguide comprising:
a slab of transparent material for propagating display light therein via total internal reflection; and
a diffraction grating supported by the slab and comprising a plurality of fringes formed by a twisted nematic (TN) liquid crystal (LC) material in a polymer substrate, wherein the fringes are slanted for out-coupling the display light from the slab by diffraction into a blazed diffraction order, wherein a greater portion of the display light is out-coupled into the blazed diffraction order, and a smaller portion of the display light is out-coupled into a non-blazed diffraction order;

wherein the TN LC material has an ordinary refractive index $n_O$ for light polarized perpendicular to molecules of the TN LC material, and an extraordinary refractive index $n_E$ for light polarized parallel to the molecules of the TN LC material, wherein a refractive index contrast for polarized display light impinging onto the diffraction grating has a refractive index contrast profile along a thickness direction of the diffraction grating; and wherein a refractive index contrast is larger at a middle than at both sides of the refractive index contrast profile.

11. The NED of claim 10, wherein a refractive index material of the polymer substrate is closer to $n_O$ than to $n_E$, whereby the refractive index contrast is larger at a middle than at both sides of the refractive index contrast profile.

12. The NED of claim 10, wherein the refractive index contrast profile is symmetrical along the thickness direction of the diffraction grating.

13. The NED of claim 10, wherein the refractive index contrast profile is substantially zero at both sides.

14. The NED of claim 10, wherein the TN LC material is polymer-stabilized.

15. The NED of claim 10, wherein the refractive index contrast profile is a smoothly varying function.

16. The NED of claim 15, wherein the smoothly varying function is a Gaussian function.

17. The NED of claim 10, further comprising an input grating for in-coupling the display light into the slab.

18. The NED of claim 10, further comprising an output grating for out-coupling the display light from the slab.

19. The NED of claim 10, wherein the scanner comprises a 2D microelectromechanical system (MEMS) scanner.

* * * * *